(12) United States Patent
Fujiwara

(10) Patent No.: US 10,409,473 B2
(45) Date of Patent: Sep. 10, 2019

(54) ELECTRONIC DISPLAY TERMINAL, NON-TRANSITORY COMPUTER READABLE STORAGE MEDIUM STORED WITH PROGRAM FOR ELECTRONIC DISPLAY TERMINAL, AND DISPLAY METHOD WITH SCROLL BAR CONTROL USING TWO COORDINATES

(71) Applicant: KONICA MINOLTA, INC., Tokyo (JP)

(72) Inventor: Tohru Fujiwara, Yokohama (JP)

(73) Assignee: KONICA MINOLTA, INC., Tokyo (JP)

( * ) Notice: Subject to any disclaimer, the term of this patent is extended or adjusted under 35 U.S.C. 154(b) by 319 days.

(21) Appl. No.: 14/301,206

(22) Filed: Jun. 10, 2014

(65) Prior Publication Data
US 2014/0380225 A1    Dec. 25, 2014

(30) Foreign Application Priority Data

Jun. 19, 2013    (JP) .................... 2013-128713

(51) Int. Cl.
*G06F 3/0485*    (2013.01)
*G06F 3/0483*    (2013.01)
*G06F 3/0488*    (2013.01)

(52) U.S. Cl.
CPC ........ *G06F 3/04855* (2013.01); *G06F 3/0483* (2013.01); *G06F 3/0488* (2013.01)

(58) Field of Classification Search
CPC ................................................. G06F 3/04855
(Continued)

(56) References Cited

U.S. PATENT DOCUMENTS 5,506,951 A * 4/1996 Ishikawa ............. G06F 3/04855
715/777
5,510,808 A * 4/1996 Cina, Jr. ............. G06F 3/04855
345/684
(Continued)

FOREIGN PATENT DOCUMENTS

CN    103034427 A    4/2013
JP    9-325879    12/1997
(Continued)

OTHER PUBLICATIONS

Notification of Reasons for Refusal and its translation from JPO appl. No. 2013-128713, dispatched Aug. 18, 2015, 6 pgs.
(Continued)

*Primary Examiner* — Ryan F Pitaro
*Assistant Examiner* — Henry Orr
(74) *Attorney, Agent, or Firm* — Squire Patton Boggs (US) LLP

(57) ABSTRACT

An electronic display terminal including a display unit which displays a file including a plurality of pages on a screen for each region of the file, and a scroll bar which includes a bar displayed on a screen and an indicator which indicates a page position of a page including the region displayed on the display unit by a relative position with respect to the length of the bar, wherein the scroll bar switches a region displayed on the display unit based on a position element of a first direction that is a longitudinal direction of the bar and a position element of a second direction which is different from the first direction at a position on a screen touched by a user, and moves the indicator to a position which indicates a page position of a page including the region displayed after the region is switched.

18 Claims, 18 Drawing Sheets

(58) Field of Classification Search
USPC .......................................................... 715/776
See application file for complete search history.

(56) References Cited

U.S. PATENT DOCUMENTS

| | | | | |
|---|---|---|---|---|
| 6,741,268 | B1* | 5/2004 | Hayakawa | G06F 3/0483 715/776 |
| 7,689,928 | B1* | 3/2010 | Gilra | G06F 3/04855 715/786 |
| 8,977,982 | B1* | 3/2015 | Amacker | G06F 3/014 715/787 |
| 9,715,482 | B1* | 7/2017 | Bjorkegren | G06F 17/24 |
| 2002/0186252 | A1* | 12/2002 | Himmel | G06F 3/04855 715/787 |
| 2004/0085364 | A1* | 5/2004 | Keely | G06F 3/0483 715/804 |
| 2006/0069996 | A1* | 3/2006 | Greaves | G06F 16/9577 715/708 |
| 2006/0236263 | A1* | 10/2006 | Bathiche | G06F 3/016 715/786 |
| 2009/0282362 | A1 | 11/2009 | Matsumoto | |
| 2010/0039400 | A1* | 2/2010 | Jang | G06F 3/0485 345/173 |
| 2010/0333016 | A1* | 12/2010 | Attwood | G06F 3/04855 715/784 |
| 2012/0042279 | A1* | 2/2012 | Naderi | G06F 3/04855 715/786 |
| 2012/0240075 | A1* | 9/2012 | Kim | G06F 3/0481 715/776 |
| 2014/0298244 | A1* | 10/2014 | Kim | G06F 3/0482 715/780 |
| 2014/0380225 | A1* | 12/2014 | Fujiwara | G06F 3/04855 715/776 |

FOREIGN PATENT DOCUMENTS

| | | |
|---|---|---|
| JP | 2001202176 A * | 7/2001 |
| JP | 2005-339295 | 12/2005 |
| JP | 2006-113765 | 4/2006 |
| JP | 2006-236142 | 9/2006 |
| JP | 2011-253404 A | 12/2011 |
| WO | WO 2010/071187 | 6/2010 |

OTHER PUBLICATIONS

Japan Patent Office, Notification of Reasons for Refusal with English translation for application No. 2013128713, dispatched Apr. 5, 2016, 7 pages.

Office Action dated Nov. 28, 2016 for CN Application No. 201410268803.5 with English translation, total of 33 pages.

* cited by examiner

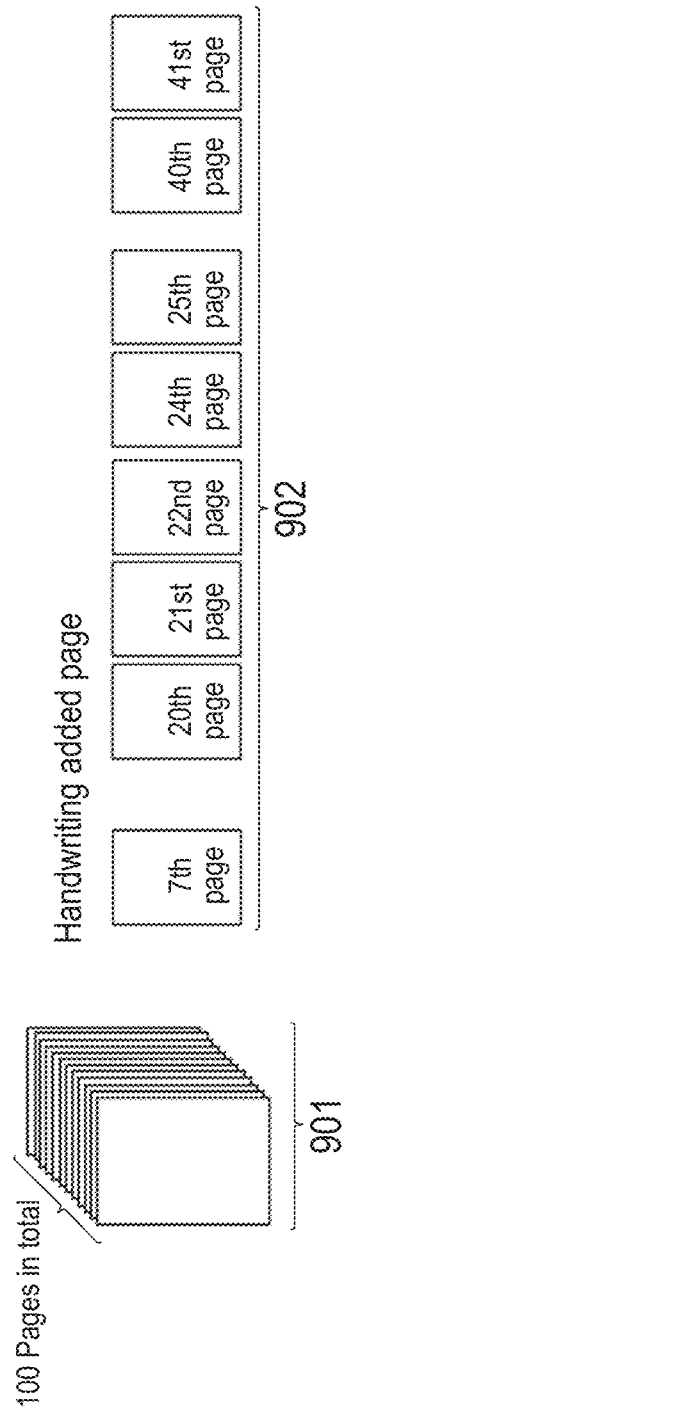

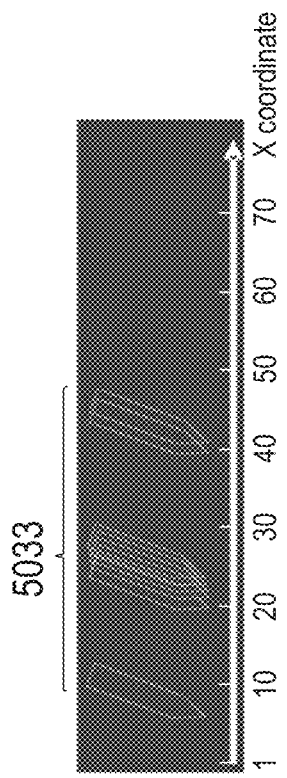

ELECTRONIC DISPLAY TERMINAL, NON-TRANSITORY COMPUTER READABLE STORAGE MEDIUM STORED WITH PROGRAM FOR ELECTRONIC DISPLAY TERMINAL, AND DISPLAY METHOD WITH SCROLL BAR CONTROL USING TWO COORDINATES

CROSS-REFERENCE TO RELATED APPLICATION

This application is based on Japanese Patent Application No. 2013-128713 filed on Jun. 19, 2013, the contents of which are incorporated herein by reference.

BACKGROUND

1. Technical Field

The invention relates to an electronic display terminal, a non-transitory computer readable storage medium stored with a program for the electronic display terminal, and a display method.

2. Description of Related Arts

In the electronic display terminal such as an electronic paper terminal and the like, it is important to easily find a desired page among the pages included in a document file and to display the desired page on a screen, so as to improve an operability of a document on the screen.

Unexamined Japanese Patent Publication No. 2006-113765 describes a technology in which a desired page of a document is easily found and displayed on a screen. That is, in a document processing device which displays superimposed images on each page of the document with a sticker added to a page, the outline of the sticker added page is displayed by detecting that a user places a cursor on the sticker. Then, a selection signal is input with the cursor placed on the sticker, and thereby the page is displayed. Accordingly, the outline of the displayed page is used as a clue while fully ensuring a display region of a page image on a screen, and thereby searching for and displaying the desired page are easily realized.

SUMMARY

However, in the above-mentioned related art, when the number of pages of the document is increased and sticker added pages which are candidates of a desired page are sequentially present, and thereby the sticker added pages are concentrated, it is difficult to exactly place the cursor on each sticker. Accordingly, a problem occurs that it is difficult to detect the desired page from the sticker added pages and to switch a display to the page.

The invention is made to solve such a problem. That is, in the electronic display terminal including a scroll bar, a region of a document is switched, which is displayed based on a position element of a first direction which is a longitudinal direction of the bar of the scroll bar and a position element of a second direction which is different from the first direction at a position touched on a screen by a user. In addition, the page position of a page which includes the region displayed after the region is switched is displayed as a relative position of an indicator on a bar with respect to the length of the bar. Accordingly, even when a page position to be displayed cannot be exactly touched on the bar of the scroll bar due to the concentration of pages which are candidates of a desired page, an exact region of a document to display can be displayed based on a touch input on a position away from the bar. Therefore, objects of the invention are to easily search for and display the desired page to display while ensuring a display region of the document even though the number of pages of the document is increased, and candidates of the desired page to display are sequentially present and concentrated.

To achieve at least one of the abovementioned objects, an electronic display terminal reflecting one aspect of the present invention comprises a display unit for displaying a file including a plurality of pages on a screen for each region of said file; and a scroll bar which comprises a bar displayed on said screen, and an indicator which is displayed on said bar and indicates a page position of a page including said region displayed on said display unit by a relative position with respect to the length of said bar, wherein said scroll bar switches said region displayed by said display unit based on a position element of a first direction that is a longitudinal direction of said bar and a position element of a second direction different from said first direction at a position on the screen that is touched by a user, and moves said indicator to a position on said bar which indicates a page position of a page including said region displayed by said display unit after said region is switched.

The electronic display terminal preferably further comprises a mark display unit which displays a page position of a characterized page among said plurality of pages on said scroll bar by a mark.

It is preferable that said characterized page is a handwriting added page.

It is preferable that said mark display unit determines that said marks of said characterized pages are displayed to be superimposed based on the number of pages included in said file and distribution of said characterized pages, said mark display unit displays one specific mark which displays at least one page position of said characterized pages which are determined to be displayed to be superimposed as a distinguishable mark from said other marks.

It is preferable that said specific mark displayed by said mark display unit is extended in said second direction by a touch input performed on said specific mark.

It is preferable that said scroll bar is displayed outside an area in which said display unit displays said region of said file.

It is preferable that said region of said file is at least one of one entire page and a portion of one page.

The objects, features, and characteristics of this invention other than those set forth above will become apparent from the description given herein below with reference to preferred embodiments illustrated in the accompanying drawings.

BRIEF DESCRIPTION OF THE DRAWINGS

FIGS. 9A-C are explanatory diagrams which, when the handwriting added pages are concentrated, illustrates by comparing between when only a pen mark displaying a page position of one page is displayed and when a specific pen mark is used to display page positions of a plurality of pages.

DETAILED DESCRIPTION

Hereinafter, an electronic display terminal, a non-transitory computer readable storage medium stored with the program for the electronic display terminal, and a display method according to an embodiment of the invention will be described in detail referring to drawings. In the specification, "display" of image data includes a meaning of "display as an image".

First Embodiment

Figure 1:
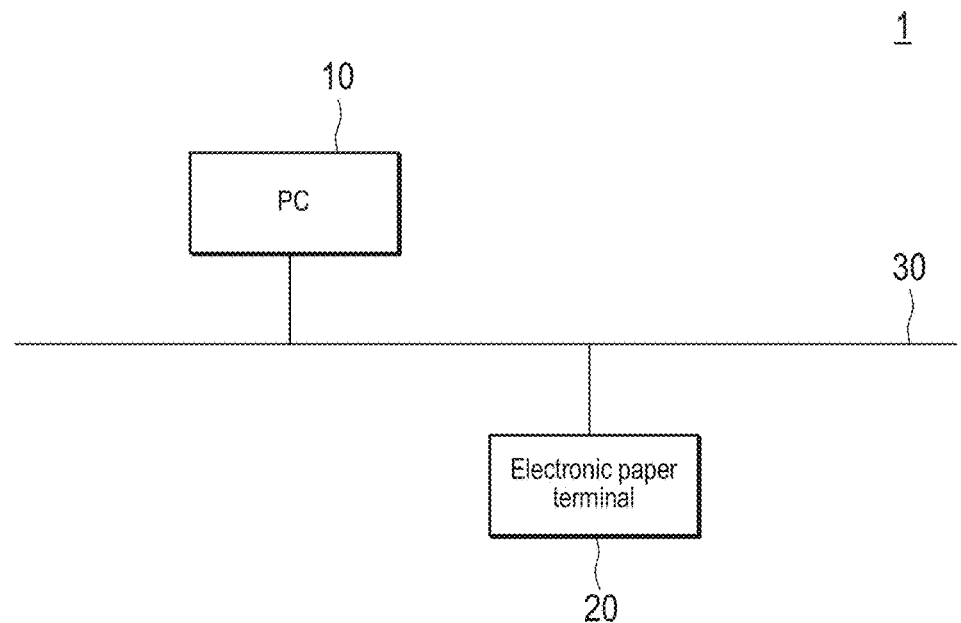
FIG. 1 is a block diagram which shows a display system which includes an electronic paper terminal that is an example of an electronic display terminal according to a first embodiment of the invention.

FIG. 1 is a block diagram which shows a display system which includes an electronic paper terminal that is an example of the electronic display terminal according to the first embodiment of the invention.

As shown in FIG. 1, a display system 1 includes a PC (Personal Computer) 10 and the electronic paper terminal 20.

As shown in FIG. 1, the PC 10 and the electronic paper terminal 20 are connected to a network 30 by wire or wirelessly to communicate with each other through the network 30. The network 30 can be configured to have a wireless or wired LAN (Local Area Network).

The number of the PCs 10 and the number of the electronic paper terminals 20 are not limited, and the PC 10 may be provided by configuring, for example, a server so as to transmit a document file (hereinafter, simply referred to as "file") to a plurality of electronic paper terminals 20.

Figure 2:
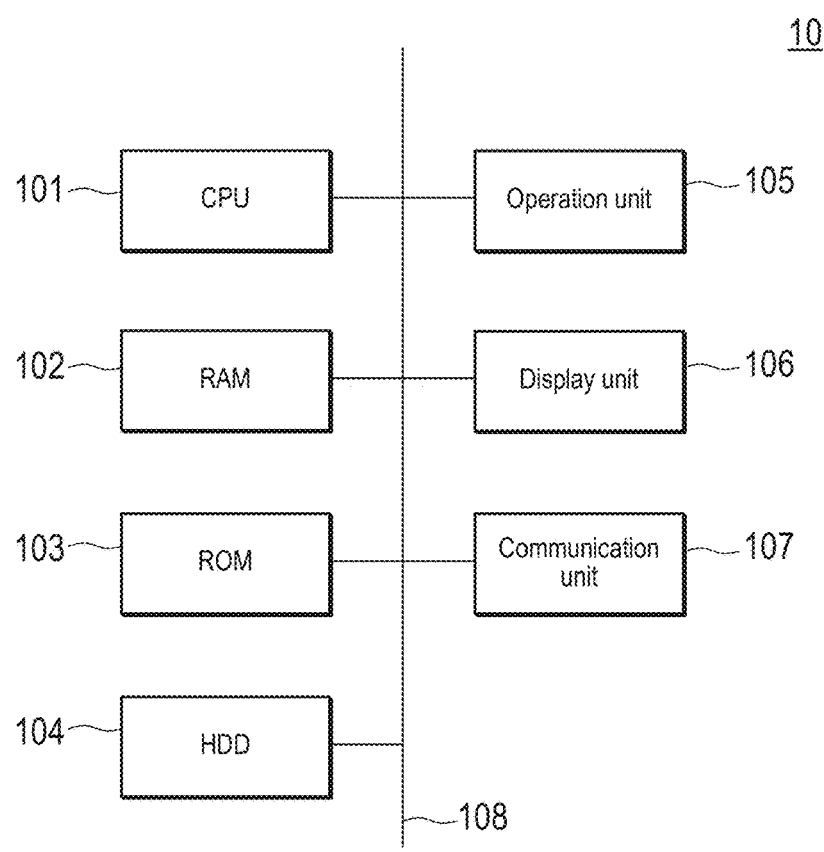
FIG. 2 is a block diagram which shows a configuration of a PC.

FIG. 2 is a block diagram which shows a configuration of the PC.

As shown in FIG. 2, the PC 10 includes a CPU (Central Processing Unit) 101, a RAM (Random Access Memory) 102, a ROM (Read Only Memory) 103, a HDD (Hard Disk Drive) 104, an operation unit 105, a display unit 106, and a communication unit 107. These are connected to one another through a bus 108 for transmitting and receiving a signal.

The CPU 101 performs a control of each of the above-mentioned units and various types of arithmetic processing according to a program.

The RAM 102 temporarily stores a program and data as an operation region.

The ROM 103 stores various types of programs and data.

The HDD 104 stores an operating system, a printer driver, and other various types of programs and data. A printer driver is software for converting a file into image data in a bit map form.

The operation unit 105 includes a pointing device such as, for example, a mouse, and a keyboard, and is used so as to perform various types of operations and inputs.

The display unit 106 is, for example, a liquid crystal display, and displays various types of information.

The communication unit 107 is an interface for a communication with an external device, and it is possible to use a wireless communication interface, a telephone line interface for being connected to a telephone line, and the like.

The PC 10 operates as follows with the above mentioned configuration.

The CPU 101 reads a file stored in the HDD 104, and converts the file into image data in a data format which can be displayed by the electronic paper terminal 20 by the printer driver, according to a request from the electronic paper terminal 20. Then, the CPU 101 transmits the converted file is to the electronic paper terminal 20.

The file converted into image data by the printer driver includes, for example, a Word document created by WORD which is word-processing software by Microsoft Corporation, an Excel document by EXCEL (registered trademark) which is spreadsheet software by Microsoft Corporation, or a PDF (Portable Document Format) document.

The data format of image data which can be displayed by the electronic paper terminal 20 is, for example, a TIFF (Tagged Image File Format) or the bit map. If the electronic paper terminal 20 can display the Word document and the PDF document in the data format as they are, it is unnecessary to convert a file into the data format by the printer driver.

Figure 3:
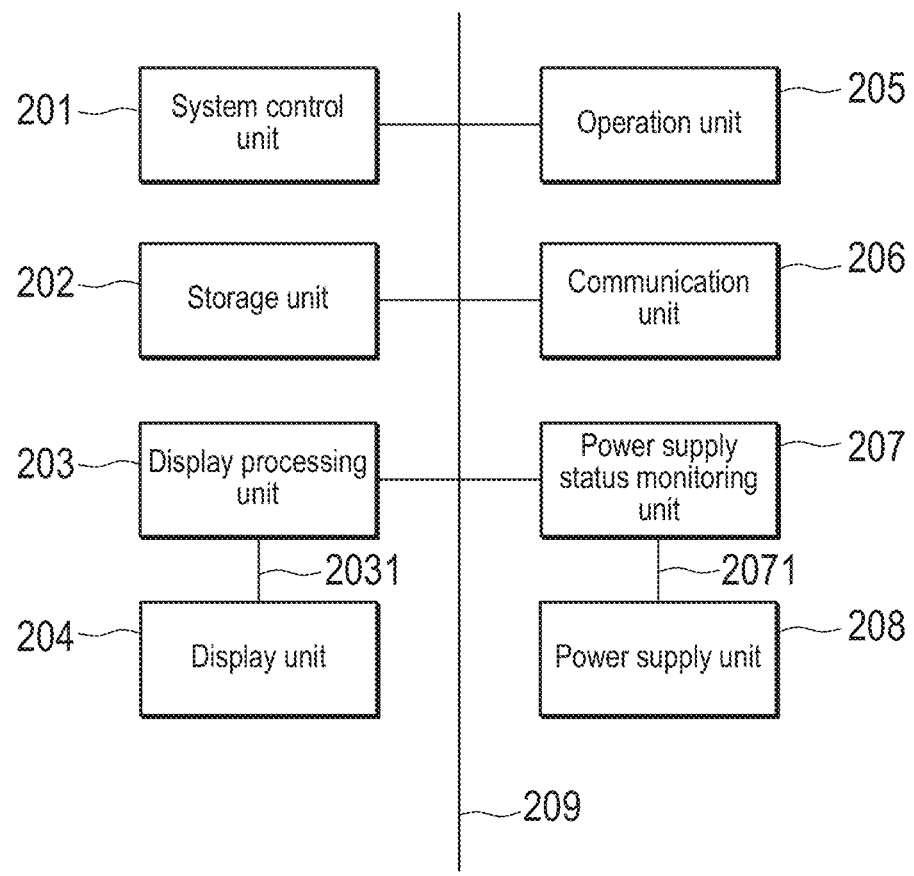
FIG. 3 is a block diagram which shows a configuration of the electronic paper terminal according to the first embodiment of the invention.

FIG. 3 is a block diagram which shows a configuration of the electronic paper terminal according to the embodiment.

As shown in FIG. 3, the electronic paper terminal 20 includes a system control unit 201, a storage unit 202, a display processing unit 203, a display unit 204, an operation unit 205, a communication unit 206, a power supply status monitoring unit 207, and a power supply unit 208. The system control unit 201, the storage unit 202, the display processing unit 203, the operation unit 205, the communication unit 206, and the power supply status monitoring unit 207 are connected to one another through a bus 209 for transmitting or receiving a signal. The display processing unit 203 and the display unit 204 are connected to each other by a dedicated line 2031 for transmitting a control signal for the display processing unit 203 to cause image data to be displayed on the display unit 204 from the display processing unit 203 to the display unit 204. The power supply unit 208 and the power supply status monitoring unit 207 are connected to each other by a dedicated line 2071 for transmitting, receiving, and the like a monitoring signal for monitoring a power supply status of the power supply unit 208.

The display unit 204 configures a display unit. The operation unit 205, the display processing unit 203, and the display unit 204 configure a mark display unit.

The system control unit 201 can be configured by, for example, a CPU, and controls each configuration element configuring the electronic paper terminal 20 and perform various types of arithmetic processing according to the program.

More specifically, the system control unit 201 performs a control of transmitting and receiving a file from the PC 10, a control of storing a file into the storage unit 202, and a control of reading a file from the storage unit 202. In addition, the system control unit 201 performs a control of displaying image data on the display unit 204 by the display processing unit 203 and a control of an operation instruction input into the operation unit 205 by a user.

The storage unit 202 can be configured, for example, by a RAM and a ROM, thereby storing various types of programs and data.

The storage unit 202 stores a file received from the PC 10, and a setting for controlling each configuration element of the electronic paper terminal 20 by the system control unit 201.

The display processing unit 203 performs a control for displaying a file which is image data on the display unit 204.

The display unit 204 is, for example, an electrophoretic display device, and is a screen on which various types of information such as image data and the like are displayed. The electrophoretic display device has features that do not consume power while maintaining a display of the same image, and consume power when updating an image to display.

Figure 4:
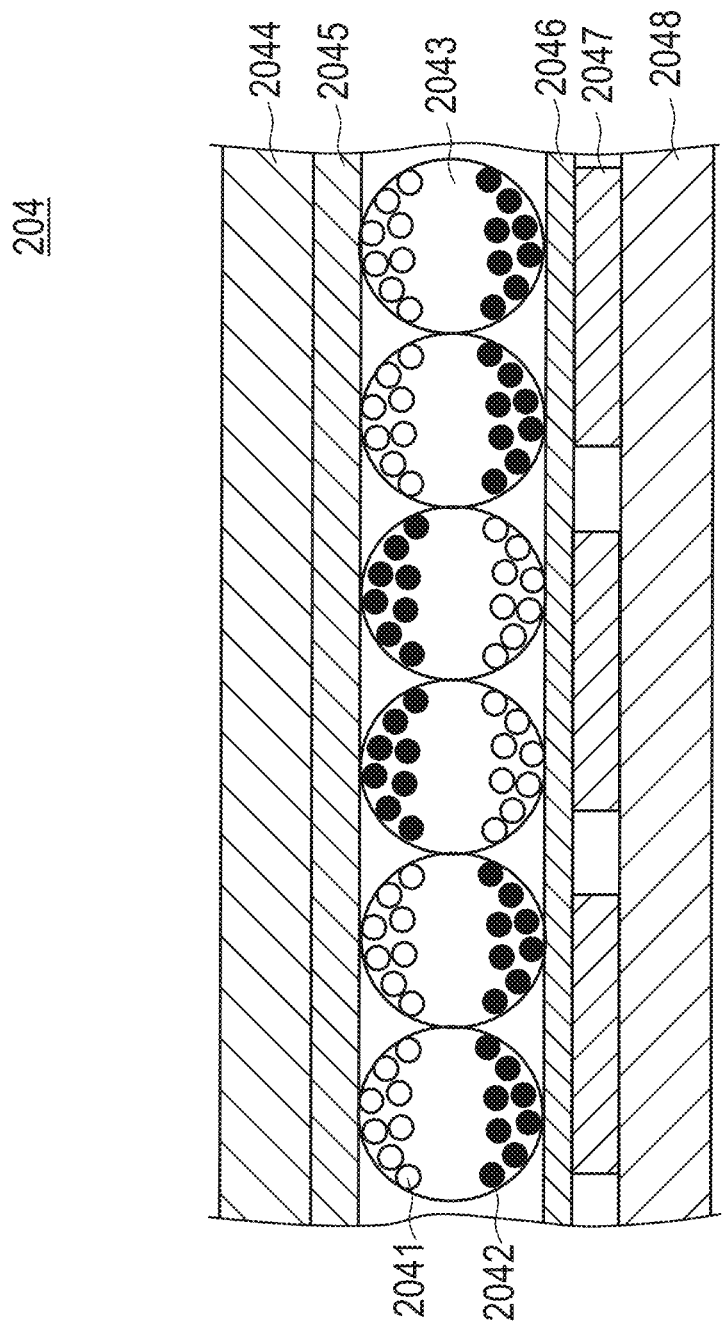
FIG. 4 is a cross-sectional view which shows a structure of a main portion of a display unit of the electronic paper terminal according to the first embodiment of the invention.

FIG. 4 is a cross-sectional view which shows a structure of a main portion of the display unit of the electronic paper terminal.

As shown in FIG. 4, the display unit 204 adopts an electrophoretic display technology by microcapsule 2043 in which a negatively charged black pigment 2042 and a positively charged white pigment 2041 are sealed with a transparent dispersion medium such as oil and the like.

A surface layer 2044 is a front substrate made from a transparent material such as a PET (Polyethylene Terephthalate) film and the like. A transparent electrode 2045 which is made from a transparent conductive film such as ITO (Indium Tin Oxide) is disposed on the back side of the surface layer 2044. Moreover, a support layer 2048 is a rear substrate made from a material having insulation properties such as a polyimide film and the like, and a rear electrode (segment electrode) 2047 made from a minute metal plate corresponding to an individual microcapsule 2043 is disposed on the front side of the support layer 2048.

The microcapsule 2043 is disposed between an individual rear electrode 2047 and the transparent electrode 2045, and an individual microcapsule 2043 is bonded to the individual rear electrode 2047 through an adhesion layer 2046. In this manner, a number of microcapsules 2043 that are two-dimensionally disposed in a space between the front substrate (surface layer 2044) and the rear substrate (support layer 2048) through two electrodes 2045 and 2047 form a display region of the display unit 204.

A display principle by the microcapsule 2043 disposed in this manner is as follows. When a positive potential is given to the rear electrode 2047 corresponding to one microcapsule 2043, a negatively charged black pigment 2042 is moved to the rear electrode 2047 side and a positively charged white pigment 2041 is moved to a transparent electrode 2045 side, so that the microcapsule 2043 is displayed in white when viewed from the front side of a display region.

In a similar manner, when a negative potential is given to the rear electrode 2047 corresponding to one microcapsule 2043, the positively charged white pigment 2041 is moved to the rear electrode 2047 side, and the negatively charged black pigment 2042 is moved to the transparent electrode 2045 side, so that the microcapsule 2043 is displayed in black when viewed from the front side of the display region.

Returning to FIG. 3, the operation unit 205 is configured, for example, by a touch panel, a scroll bar, a button, and an icon, and various types of operation instruction and a character, a mark, a figure, or the like by handwriting (hereinafter, simply referred to as "handwriting") are input by a user.

The touch panel which is a configuration element of the operation unit 205 is attached to a display surface side of a display configuring the display unit 204, and the operation unit 205 can detect a position which is touched using a touch pen and the like by the user on the touch panel as coordinates. With a page of a file (hereinafter, simply referred to as "page") displayed on the display unit 204, the user can input handwriting by a touch input on the page. The operation unit 205 can generate handwriting data by converting an input of handwriting by a touch input into coordinate data, and add the handwriting data to the page as layer data of the page displayed on the display unit 204. Accordingly, the handwriting data is superimposed on the page to be displayed on the display unit 204.

The scroll bar which is a configuration element of the operation unit 205 indicates a page position of a page displayed on the display unit 204 according to a relative position between a bar and a knob which is an indicator. More specifically, the scroll bar indicates a page position of the page displayed on the display unit 204 according to a relative position between the length of the bar and the knob which is an indicator. Here, "page position" refers to a relative position of the page with respect to all pages when pages included in a file are arranged in an order of page number. In addition, the scroll bar moves the indicator to a position which is touched by the user on the bar and displays a page at the page position corresponding to a position of the indicator after the movement on the display unit 204. Here, "indicator" includes the knob and a scroll area which are general configuration elements of the scroll bar.

Figure 5:
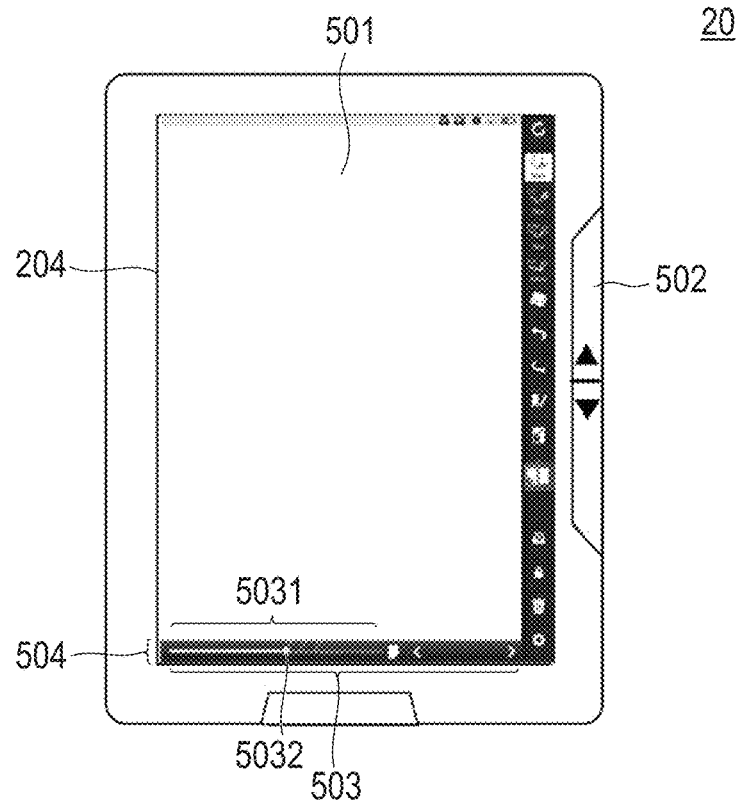
FIG. 5 is a front view of the electronic paper terminal according to the first embodiment of the invention.

FIG. 5 is a front view of the electronic paper terminal.

As shown in FIG. 5, a page is displayed on a page display region 501 of the display unit 204 of the electronic paper terminal 20. The pages displayed in the page display region 501 can be switched one by one by pressing a page turning button 502.

The scroll bar 503 is displayed on a lower display unit 504 which are outside the area of the page display region 501 in which a page is displayed in the display unit 204.

The scroll bar indicates a page position of a page displayed on the page display region 501 according to the length of the bar and a relative position of the knob 5032. In addition, the scroll bar 503 moves the knob 5032 which is the indicator to a position which is touched by the user on the bar 5031, and displays a page at a page position corresponding to the position of the knob 5032 after the movement on the page display region 501.

Figure 6:
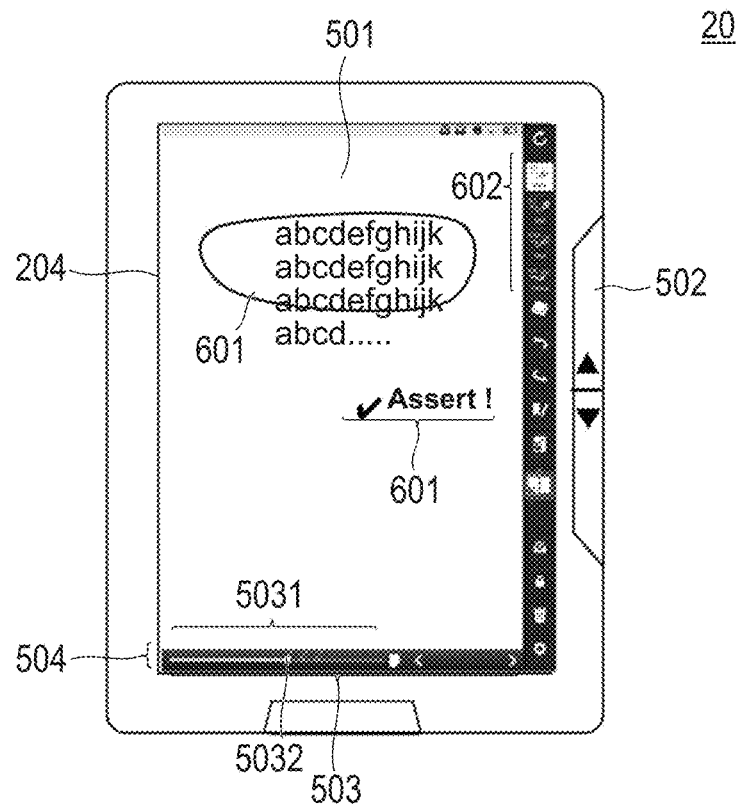
FIG. 6 is a view which shows a state in which a handwriting added page is displayed in the electronic paper terminal according to the first embodiment of the invention.

FIG. 6 is a view which shows a state in which a handwriting added page is displayed in the electronic paper terminal. The handwriting added page corresponds to a characterized page.

As shown in FIG. 6, handwriting 601 is added to a page displayed on the page display region 501 by a touch input using the touch pen.

By clicking an icon 602 for changing a line format among icons displayed at a right side of the page display region 501, it is possible to change a line format such as thickness, color, type and the like of the lines of the handwriting. As described below, when displaying a pen mark which is a mark indicating the page position of a handwriting added page in the scroll bar 503, information of the line format of the handwriting can be used in a filtering for displaying only the handwriting added page by a line with any given format.

Figure 7:
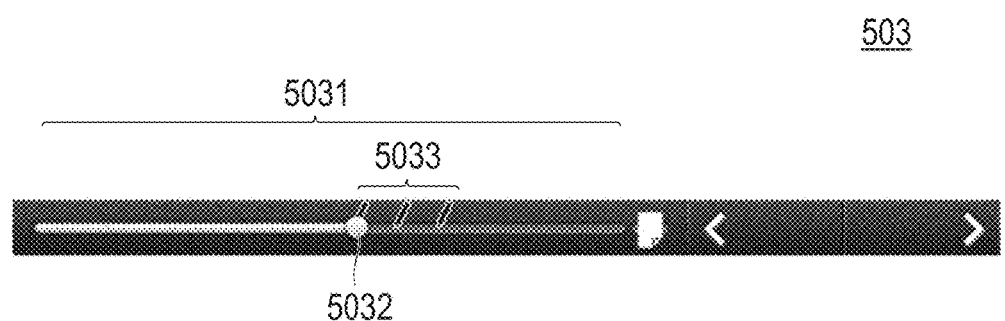
FIG. 7 is a view which shows a scroll bar in a state where a pen mark showing a page position of the handwriting added page is displayed.
Figure 8:
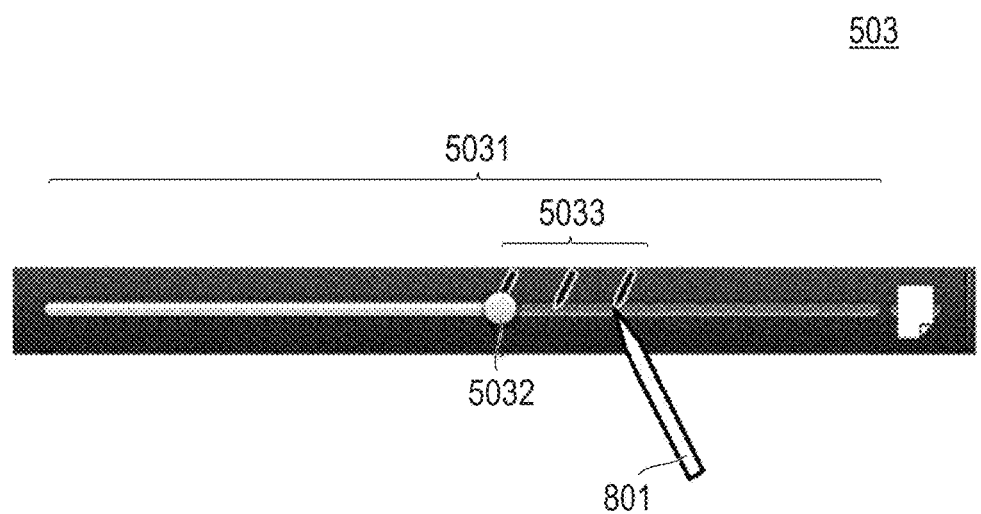
FIG. 8 is a view which shows a state of performing a touch input to the pen mark so as to display another handwriting added page in the scroll bar with pen marks showing the page positions of handwriting added pages displayed.

FIG. 7 is a view which shows the scroll bar in a state where a pen mark showing a page position of a handwriting added page is displayed. FIG. 8 is a view which shows a state of performing a touch input to the pen mark so as to display another handwriting added page in the scroll bar with the pen marks showing page positions of the handwriting added pages are displayed.

The system control unit 201 detects a page in which handwriting data is added as layer data, and displays the pen mark 5033 showing the page position of the page in the scroll bar 503.

As shown in FIG. 7, three pen marks 5033 each showing the page position of the handwriting added page are shown in the scroll bar 503. Accordingly, it is known by the pen marks 5033 that handwriting is added to each page of three page positions where the pen marks 5033 are displayed, respectively.

The user can directly display the handwriting added page at the page position of the pen mark 5033 which is touched on the page display region 501 by performing a touch input on any of the pen marks 5033 using the touch pen on the bar 5031 of the scroll bar 503.

In a state shown in FIG. 7, the knob 5032 of the scroll bar 503 is positioned to indicate a page position of a page with the smallest page number among the three pen marks 5033. Therefore, in this state, the page with the smallest page number among the handwriting added pages is displayed in the page display region 501.

As shown in FIG. 8, the user can perform a touch input using the touch pen 801 on a pen mark displayed at the page position of a page with the largest page number among three pen marks 5033 displayed in the scroll bar 503. Accordingly, it is possible to directly display a page with the largest page number among the handwriting added pages on the page display region 501.

Respective pen marks 5033 displayed on FIGS. 7 and 8 indicate a page position of each page of the handwriting added pages. That is, the respective pen marks 5033 indicate a page position of each single page. In the examples of FIGS. 7 and 8, since the number of handwriting added pages is much less than the number of all pages of a file, and the handwriting added pages are not sequential, the pen marks 5033 are not superimposed on each other, and an accurate touch input to the pen mark 5033 becomes easy. However, when the number of pages of a file is increased, and the handwriting added pages are sequentially present, and thereby the handwriting added pages are concentrated at a portion of a file, the pen marks 5043 are superimposed on each other and an exact touch input to the pen mark 5033 becomes difficult.

Therefore, in the embodiment, when the pen marks 5033 are superimposed on each other by the concentration of the handwriting added pages, page positions of a plurality of handwriting added pages are displayed by a specific pen mark 5033A which can be distinguished from other pen marks 5033. Furthermore, by changing a position to be touched by the touch pen 801 in a direction away from or towards the scroll bar 503 on the specific pen marks 5033A, a page displayed on the page display region 501 among the plurality of pages whose page positions are displayed by a specific pen mark is switched.

Figure 9C:
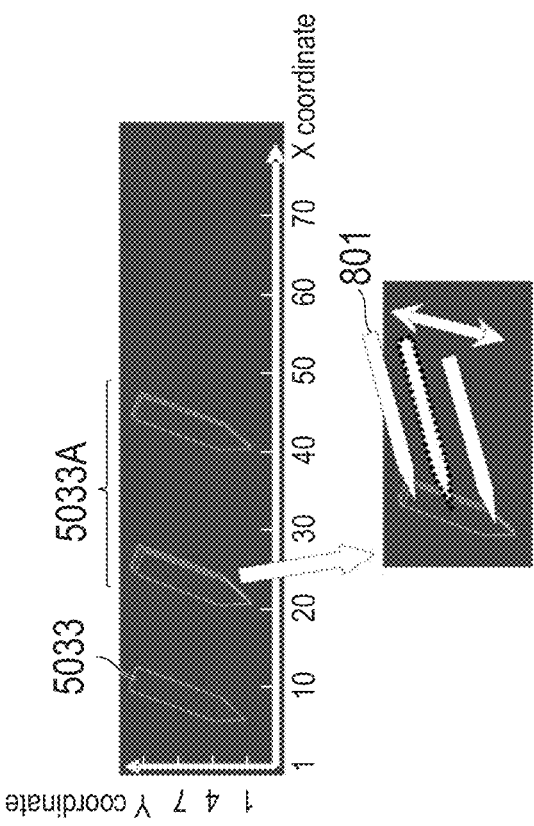

FIGS. 9A-9C are explanatory diagrams which, when the handwriting added pages are concentrated, illustrates by comparing between when only the pen mark displaying a page position of one page is displayed and when the specific pen mark is used to display page positions of a plurality of pages.

FIG. 9A is a conceptual diagram which shows all pages 901 of a file, and handwriting added pages 902. FIG. 9B is a diagram which shows the upper portion of the scroll bar when displaying a page position of each handwriting added page using only the pen mark displaying a page position of one page in case that the handwriting added pages are concentrated. FIG. 9C is a diagram which shows the upper portion of the scroll bar when displaying the page position of each handwriting added page by using the specific pen mark which displays the page positions of a plurality of pages in case that the handwriting added pages are concentrated.

As shown in FIG. 9A, the handwriting added pages are a seventh page, $20^{th}$ to $22^{nd}$ pages, $24^{th}$ to $25^{th}$ pages, and $40^{th}$ to $41^{st}$ pages.

As shown in FIG. 9B, when the handwriting added pages are concentrated, and each of the handwriting added pages is displayed only by the pen mark 5033 which displays a page position of one page, the pen marks 5033 are superimposed on each other and displayed. In particular, the pen marks 5033 which display page positions of $20^{th}$ to $22^{nd}$, and $23^{rd}$ to $24^{th}$ pages which are sequential handwriting added pages are significantly superimposed on each other, so that it is difficult to exactly perform a touch input with respect to each pen mark 5033.

Therefore, in the embodiment, as shown in an above figure in FIG. 9C, the system control unit 201 determines whether or not the pen marks 5033 are superimposed on each other by the concentration of the handwriting added pages. The system control unit 201 determines whether or not the pen marks 5033 are superimposed on each other based on the number of pages included in a file and the distribution of the handwriting added pages. Here, the "distribution of pages" includes all pieces of information which show a frequency of handwriting added pages present among all pages included in a file, for example, a page interval. The system control unit 201 can determine whether or not the pen marks 5033 are superimposed on each other by, for example, the large number of pages included in a file and the sequence of the handwriting added pages (that is, the page interval of the handwriting added page is zero). In this regard, the system control unit 201 may determine whether or not the pen marks 5033 are superimposed by setting a threshold to each of the number of pages included in the file and the page interval of the handwriting added pages.

When the system control unit 201 determines that the pen marks 5033 are superimposed on each other, the operation unit 205 displays page positions of handwriting added pages in the scroll bar 504 by using the specific pen marks 5033A displaying the page positions of a plurality of pages. The specific pen marks 5033A can be displayed at a position on the bar 5031 of the scroll bar 503 corresponding to the page position of any of the plurality of pages whose page positions are displayed by the specific pen marks 5033A. For example, it is possible to dispose the tip of the specific pen mark 5033A at a position on the bar 5031 of the scroll bar 503 corresponding to the page position of a page with the smallest page number among a plurality of pages whose page positions are displayed by the specific pen mark 5033A.

Moreover, as shown in FIG. 9C, the specific pen mark 5033A can have an appearance in which other pen marks be superimposed on the back of one pen mark as the uppermost layer so as to distinguish itself from other pen marks 5033.

Furthermore, as shown in a below figure of FIG. 9C, the user performs a touch input which causes the touch pen 801 to slide in a direction away from or towards the scroll bar 504 as the touch pen 801 is touching on the specific pen mark 5033A. Alternatively, the user performs a touch input which causes the touch pen 801 to be touched one by one in a direction away from or towards the scroll bar 504 along the specific pen mark 5033A. The operation unit 205 detects the touch input performed by the user on the specific pen mark 5033A. The operation unit 205 switches a page displayed in the display region 501 among a plurality of pages whose page positions are displayed by the specific pen mark 5033A based on a position which is touched on the specific pen mark 5033A. That is, the operation unit 205 switches a page which is displayed based on a position element (X coordinate) of a first direction which is a longitudinal direction of the bar 5031 of the scroll bar 503 and a position element (Y coordinate) of a second direction which is a direction different from the longitudinal direction of the bar 5031 of a touch input position. The second direction may be a longitudinal direction of the specific pen mark 5033A which is a direction along the specific pen mark 5033A. The operation unit 205 switches a page displayed based on the touch input position on the specific pen mark 5033A, and moves the knob 502 of the scroll bar 503 to a position indicating a page position of a page displayed in the display region 501 after switching the page.

As shown in the below figure in FIG. 9C, the user causes the touch pen 801 to slide from the lower side close to the scroll bar 503 of the specific pen mark 5033A toward the upper side away from the scroll bar 503 as the touch pen 801 is touching on the specific pen mark 5033A. Alternatively, the user changes a position to touch one by one from the lower side of the specific pen mark 5033A to the upper side of the specific pen mark 5033A. By such a touch input, each page is switched and displayed on a page display region 501 of the display unit 204 in an order of a $20^{th}$, a $21^{st}$, a $22^{nd}$, a $24^{th}$, and a $25^{th}$ page.

The specific pen mark 5033A may be configured to extend in the second direction by being touched.

Figure 10:
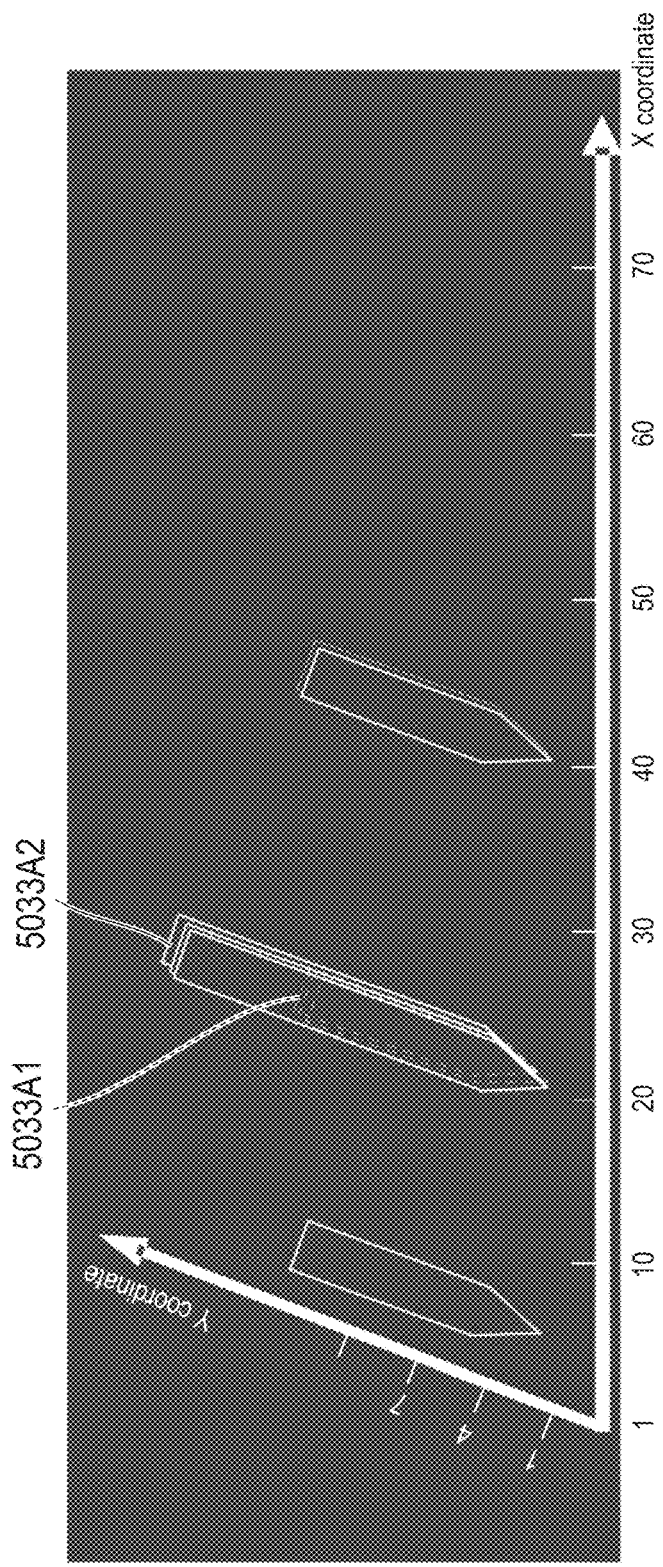
FIG. 10 is a diagram which compares states before and after extension in a second direction by a touch input on the specific pen mark.

FIG. 10 is a diagram which compares states before and after extension in the second direction by a touch input on the specific pen mark. In FIG. 10, a pen mark 5033A2 extended in the second direction is displayed in a solid line, and a pen mark 5033A1 before being extended in the second direction is displayed in a dashed line. The second direction is set to a direction along the specific pen mark 5033A. Thus, by having the specific pen mark 5033A extended in a second direction by a touch, it is possible to easily and exactly display a plurality of handwriting added pages displayed by the specific pen mark 5033A by a touch input to a direction of extending the specific pen mark 5033A.

Figure 11:
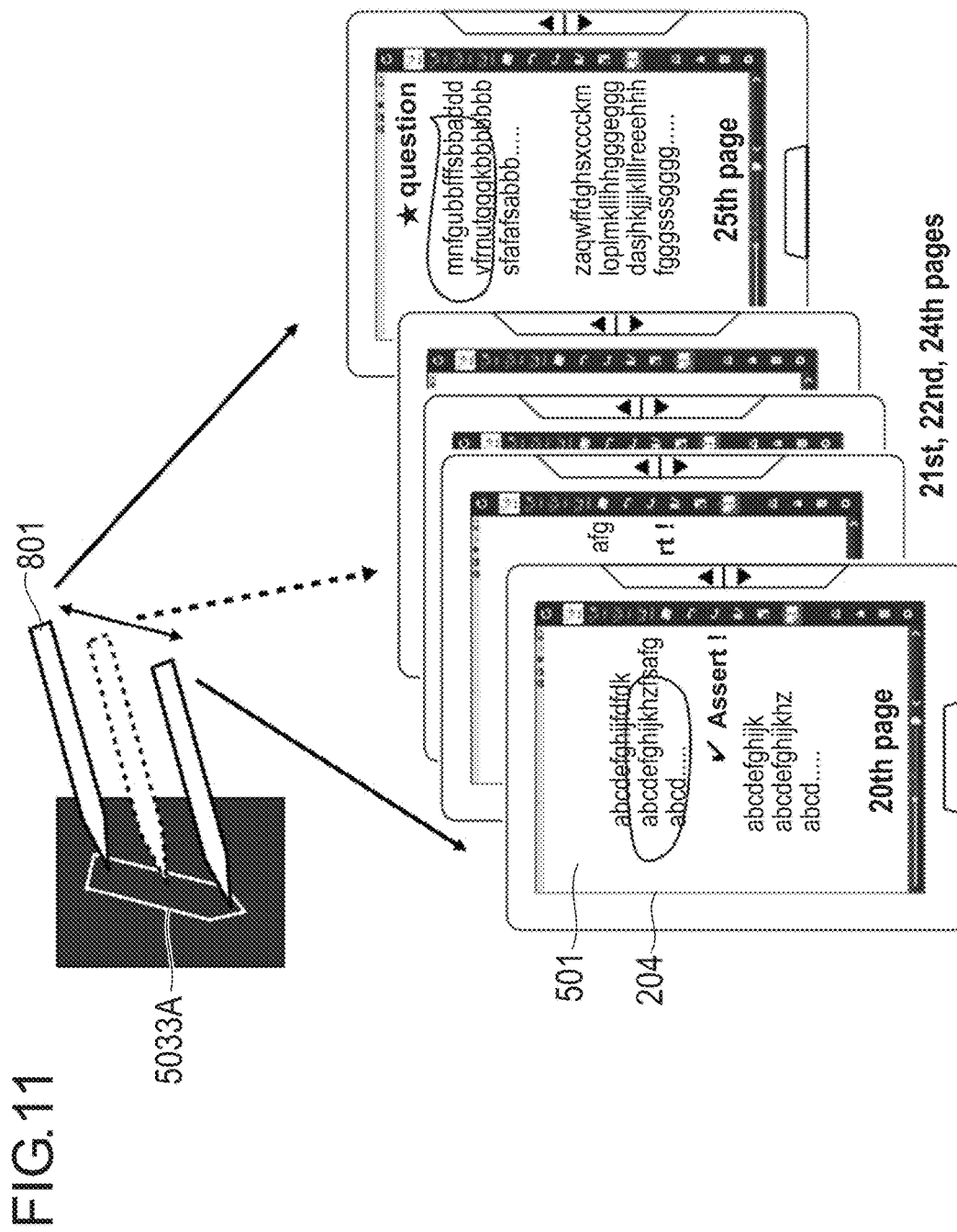
FIG. 11 is a diagram which shows a relative relation between a touch input position on the specific pen mark and a page displayed in a page display region of the display unit.

FIG. 11 is a diagram which shows a relative relation between a touch input position on the specific pen mark and a page displayed in the page display region of the display unit.

As shown in FIG. 11, as a touch input position on the specific pen mark 5033A changes up and down, $20^{th}$, $21^{st}$, $22^{nd}$, $24^{th}$, and $25^{th}$ pages, which are the handwriting added pages and are concentrated, are switched and displayed in the page display region 501.

Returning to FIG. 3, other configuration elements of the electronic paper terminal 20 according to the embodiment will be described.

The communication unit 206 is an interface for communicating with an external device, and can use a wireless communication interface, a telephone line interface for connecting to a telephone line, and the like.

The communication unit 206 performs transmission and reception of a file and other data between the communication unit 206 and the PC 10.

The power supply status monitoring unit 207 monitors a status of the power supply unit 208, and detects a remaining amount of a battery so as to transmit the result to the system control unit 201. The remaining amount of the battery can be detected, for example, by measuring an output voltage of the power supply unit 208, and comparing the measured output voltage with a table of relationship between the output voltage of the power supply unit 208 and the remaining amount of the battery, which is previously obtained and stored in the storage unit 202.

The system control unit 201 may display a warning on the display unit 204 when the remaining amount of the battery received by the power supply status monitoring unit 207 is less than a predetermined threshold.

The power supply unit 208 is a device which supplies power to hardware as a configuration element of the electronic paper terminal 20, and can be configured to have a secondary battery such as an alkaline storage battery, a lithium-ion battery, and the like considering portability of the electronic paper terminal 20.

The electronic paper terminal 20 includes the above-mentioned configuration so as to operate as follows.

The communication unit 206 receives a file from the PC 10 based on an instruction of the user which is input to the operation unit 205, and the storage unit 202 stores the file received by the communication unit 206.

The display unit 204 displays the file received by the communication unit 206 page by page according to a control of the display processing unit 203.

The operation unit 205 generates handwriting data by converting handwriting which is touched on the touch panel by the user into coordinate data at a touch input position, and adds the handwriting data to a file as layer data of a handwriting added page so as to store the handwriting data in the storage unit 202. The display unit 204 displays the handwriting data with a page.

The system control unit 201 detects the handwriting added pages as layer data, and displays the pen marks 5033 indicating page positions of the pages in the scroll bar 503. At this time, when the pen marks 5033 are superimposed on each other by a concentration of handwriting added pages, the system control unit 201 uses the specific pen mark 5033A which displays a page position of a plurality of pages so as to display the handwriting added pages.

The operation unit 205 detects that a touch input position is changed in a direction away from or towards the scroll bar 504 on the specific pen mark by the user. The operation unit 205 switches a page displayed in the display region 501 among the plurality of pages whose page positions are displayed by the specific pen mark 5033A based on the touch input position on the specific pen mark 5033A.

Next, an operation of the electronic paper terminal 20 will be described referring to the flowcharts of FIGS. 12 to 15.

Figure 12:
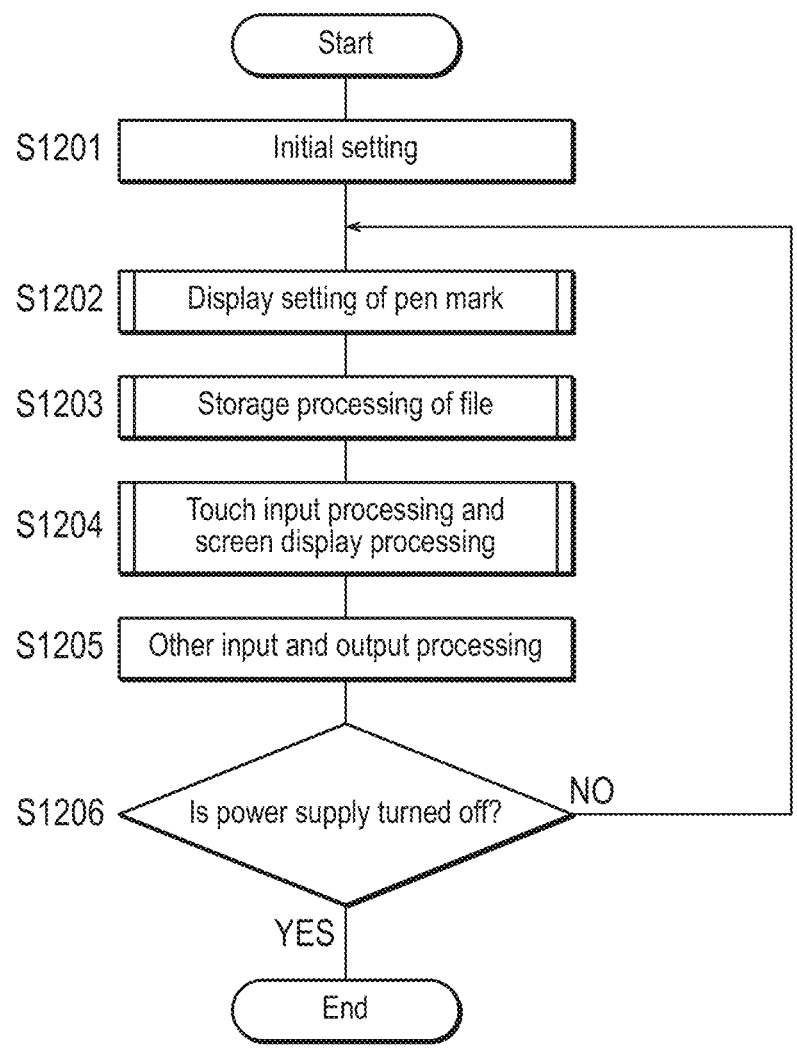
FIG. 12 is a flowchart of each operation of the electronic paper terminal according to the first embodiment of the invention.

FIG. 12 is a flowchart of each operation of the electronic paper terminal according to the embodiment. The flowchart can be performed by a program installed in the electronic paper terminal 20.

The system control unit 201 performs an initial setting when a power supply is turned on (S1201). The initial setting refers to performing an initialization for allowing loading of a file, a touch input, and other operations by the user by displaying an initial screen on the display unit 204.

Figure 13:
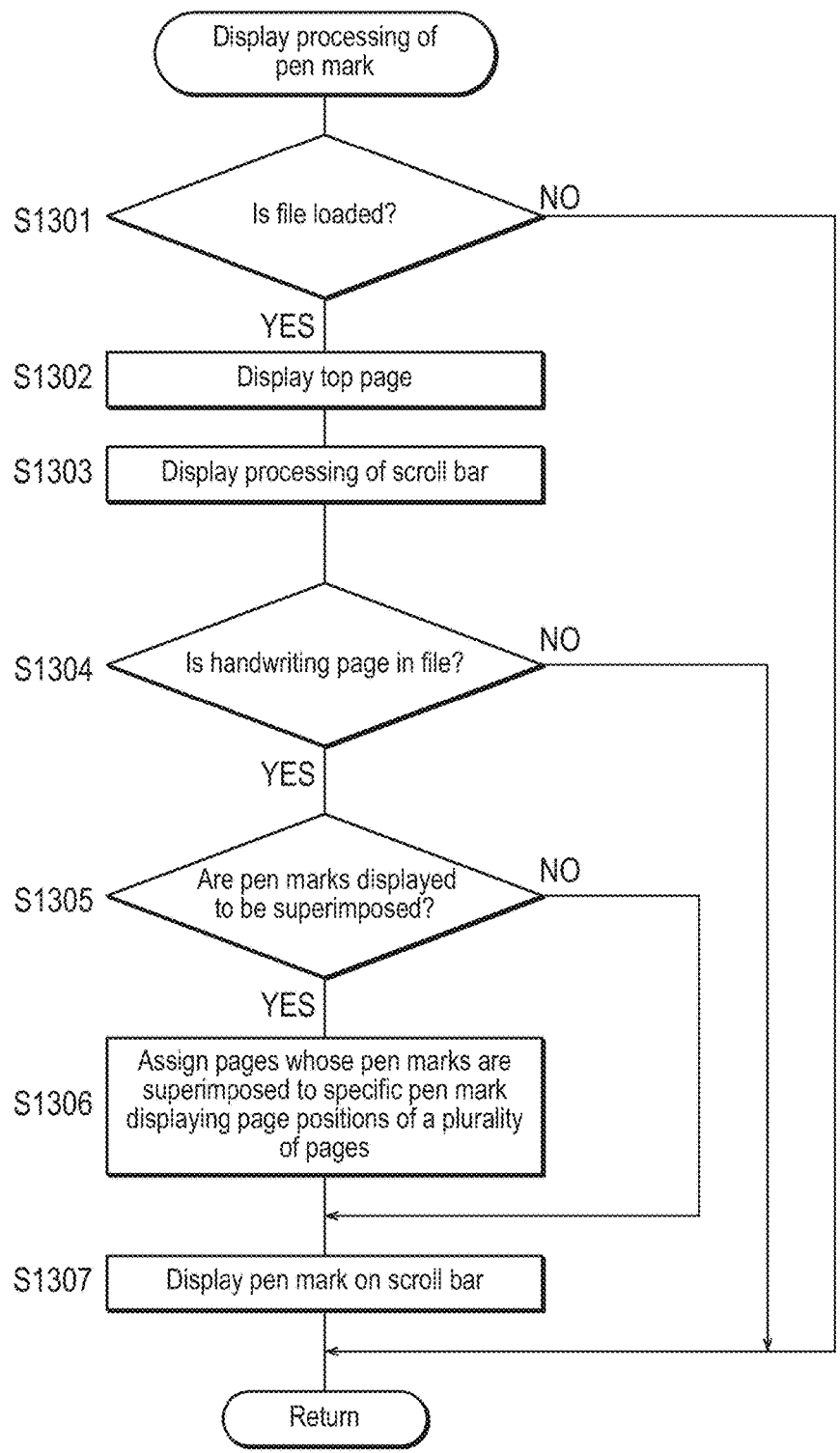
FIG. 13 is a subroutine flowchart of step S1202 in the flowchart of FIG. 12.

The system control unit 201 performs a display setting of the pen mark (S1202). FIG. 13 is a subroutine flowchart of step S1202.

The system control unit 201 determines whether or not there is loading of a new file based on an instruction by the user (S1301). The system control unit 201 ends the subroutine flowchart when it is determined that there is no loading of a new file (NO in S1301).

The system control unit 201 displays a top page (first page) of the loaded file in the page display region 501 of the display unit 204 when it is determined that there is loading of a new file (YES in S1301).

The system control unit 201 performs display processing of the scroll bar 503 and displays the scroll bar 503 on the touch panel (S1303). At this time, since the top page is displayed in the page display region 501, the knob 5032 of the scroll bar 503 is displayed at a position indicating a page position of the top page.

The system control unit 201 determines whether there is a handwriting-input page or not in a file (S1304). The system control unit 201 ends the subroutine flowchart when determining there is no handwriting added page in the file (NO in S1304).

When determining there is a handwriting added page in the file (YES in S1304), the system control unit 201 determines whether or not the pen marks 5033 are superimposed on each other due to the concentration of the handwriting added pages if the pen marks 5033 are displayed in the scroll bar 503 (S1305). The system control unit 201 proceeds to step S1207 when determining that the pen marks 5033 are not superimposed even though the pen marks 5033 are displayed in the scroll bar 503 (NO in S1305).

When determining that the pen marks 5033 are superimposed on each other if the pen mark 5033 is displayed in the scroll bar 503 (YES in S1305), the system control unit 201 assigns a plurality of pages whose pen marks 5033 are superimposed if the pen mark 5033 is displayed to the specific pen mark 5033 displaying a page position of the plurality of pages (S1306).

The system control unit 201 displays the pen mark 5033 which displays a page position of the handwriting added page on the scroll bar 503, and the specific pen mark 5033A which displays a page position of the plurality of pages and to which the plurality of pages are assigned in step S1206.

Figure 14:
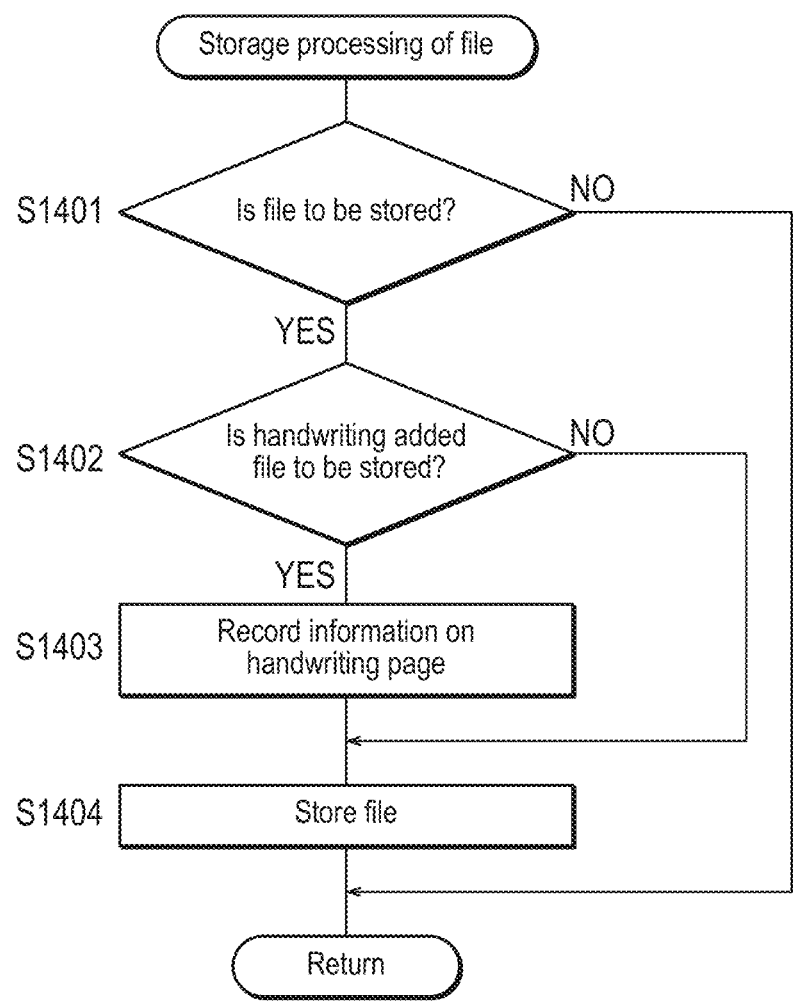
FIG. 14 is a subroutine flowchart of step S1203 in the flowchart of FIG. 12.

Returning to FIG. 12, the system control unit 201 performs processing of storing a file (S1203). FIG. 14 is a subroutine flowchart of step S1203.

The system control unit 201 determines whether to store a file or not based on an instruction of the user (S1401). The system control unit 201 ends the subroutine flowchart when determining not to store a file (NO in S1401).

When the system control unit 201 determines to store a file (YES in S1401), the system control unit 201 determines whether to store a file to which handwriting is added by the user (S1402). The system control unit 201 proceeds to step S1404 and stores the file when determining not to store the handwriting added file (NO in S1402).

When determining to store the handwriting added file (YES in S1402), the system control unit 201 adds information on the handwriting added page (hereinafter, referred to as "information on a handwriting page") to a file as layer data. The information on a handwriting page includes, for example, a page number of a handwriting added page, a date when handwriting is added, a type of handwriting, and an amount of handwriting (area) besides handwriting data.

Here, the type of handwriting is, for example, a format of the lines of handwriting such as a thickness, color, a type, and the like of the lines of handwriting. In addition, the amount of handwriting is a sum of the areas of the lines of handwriting, and shows how much handwriting is added.

The page number of a handwriting added page, the date when a handwriting is added, the type of handwriting, and the amount (area) of handwriting can be used in a filtering performed when displaying the pen mark indicating a page position of a handwriting added page in the scroll bar 503. For example, when a blue line is used for an addition of "assert" in the addition of handwriting, the system control unit 201 can display the specific pen mark 5033A or other pen marks 5033 only for the handwriting added page by the blue line according to the user's operation based on the information on handwriting added pages. Accordingly, the user can simply display only a page to which handwriting of "assert" is added.

The system control unit 201 stores both information on the handwriting page and the file when the information on the handwriting page is added to the file (S1404).

Figure 15:
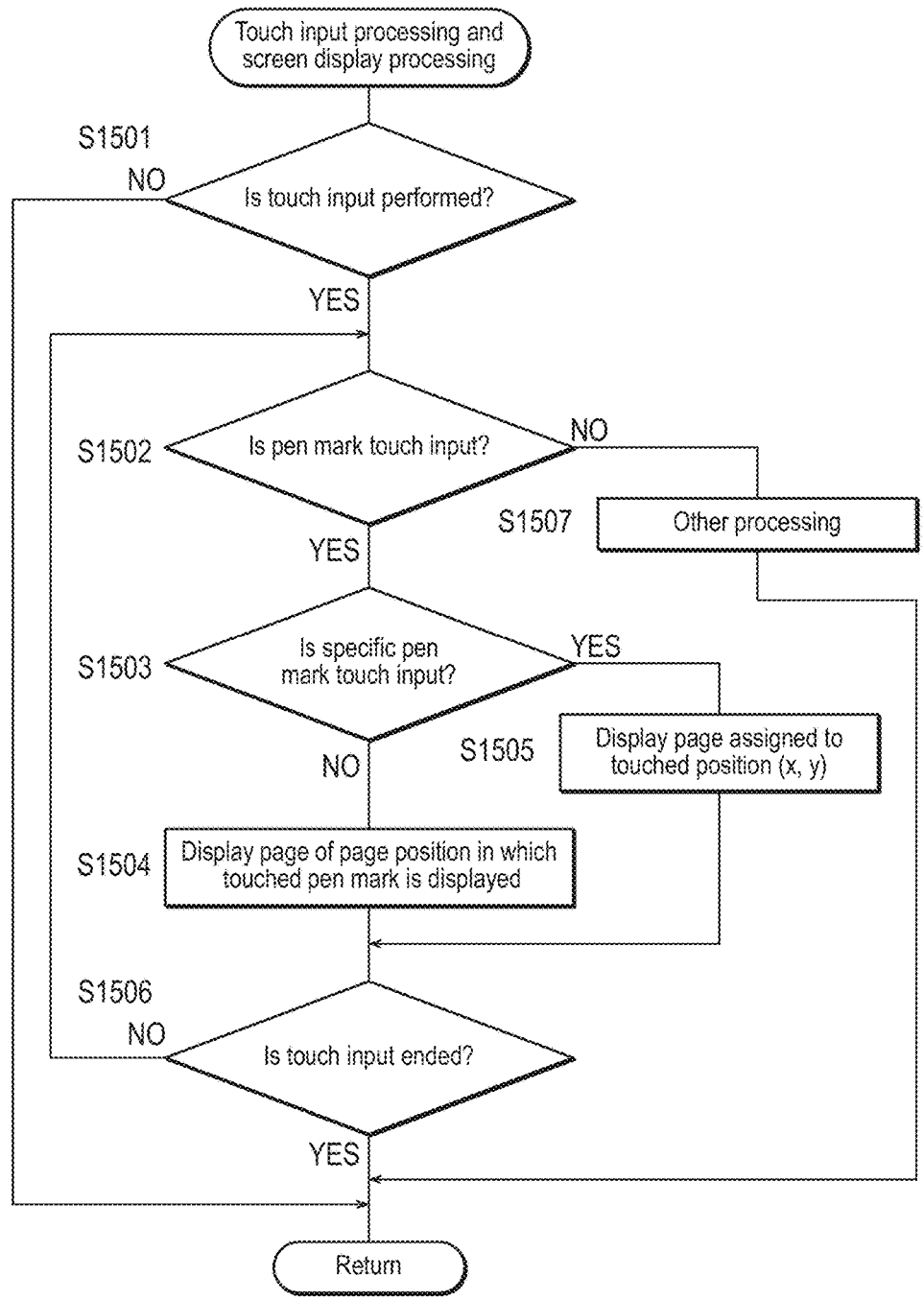
FIG. 15 is a subroutine flowchart of step S1204 in the flowchart of FIG. 12.

Returning to FIG. 12, the system control unit 201 performs touch input processing and screen display processing (S1204). FIG. 15 is a subroutine flowchart of step S1204.

The operation unit 205 determines whether or not a touch input is performed by a user (S1501). When the operation unit 205 determines that a touch input is not performed (NO in S1501), the operation unit 205 ends the subroutine flowchart.

When the operation unit 205 determines that a touch input is performed (YES in S1501), the operation unit 205 determines whether or not a touch input is performed at a specific pen mark 5033A or the other pen marks 5033 (S1502). When determining that a touch input is not performed at the specific pen mark 5033A or the other pen marks 5033 (NO in S1502), the operation unit 205 performs the other processing (S1507). The other processing is, for example, processing of inputting handwriting to a page.

When the operation unit 205 determines that a touch input is performed on the specific pen mark 5033A or other pen marks 5033 (YES in S1502), the operation unit 205 determines whether or not the specific pen mark 5033A is touched (S1503).

When the operation unit 205 determines that the specific pen mark 5033A is not touched (NO in S1503), the operation unit 205 displays a page at a page position in the scroll bar 503, in which the pen mark 5033 which is touched is displayed, in the display region 501 of the display unit 204 (S1504).

When the operation unit 205 determines that the specific pen mark 5033A is touched (YES in S1503), the operation unit 205 displays, based on coordinates (X, Y) on the specific pen mark 5033A which is touched position, a page assigned to the coordinates in the display region 501 of the display unit 204 (S1504).

Steps S1503 to S1506 are repeated until the touch input is ended (S1506). That is, for example, when a user performs a touch input to cause the touch pen 801 to slide in a direction away from or towards the scroll bar 503 as being touched on the specific pen mark 5033A, the touch input is not ended while the touch pen 801 is slid. Accordingly, in this case, based on coordinates (X, Y) of a position on the specific pen mark 5033A, which is sequentially touched by the sliding of the touch pen 801, a page assigned to the coordinates is sequentially displayed in the display region 501.

Returning to FIG. 12, the system control unit 201 performs the other input and output processing (S1205). The other input and output processing is, for example, a transmission of the handwriting added file to the PC 10.

The system control unit 201 repeatedly performs steps S1202 to S1206 until a power supply is turned off by the user (S1206).

An electronic display terminal, a non-transitory computer readable storage medium stored with the program for the electronic display terminal, and a display method are described according to the first embodiment of the invention. The embodiment exhibits the following effects.

In the electronic display terminal including the scroll bar, the mark which indicates a page position of the characterized page is displayed in the scroll bar. Furthermore, a region of a document which is displayed is switched, based on a position element of the first direction which is the longitudinal direction of the bar of the scroll bar and a position element of the second direction which is different from the first direction at a position touched by the user on the screen. Additionally, the page position of the page including the region displayed after the region is switched is displayed as a relative position of the indicator on the bar with respect to the length of the bar. Accordingly, even when pages which are candidates of a desired page are concentrated, and a position of the page to display cannot be exactly touched on the bar of the scroll bar, it is possible to display a region of a document, which is intended to be more exactly displayed based on the touch input on the position away from the bar, relying on the mark indicating a page position of the candidate of a desired page. Therefore, even when the number of pages of the document is increased and candidates of the desired page to display are sequential so that candidates of a desired page to display are concentrated, it is possible to easily search for and display the desired page to display while ensuring a display region of the document.

Furthermore, the characterized page is the handwriting added page, thereby it is possible to easily search for and display a desired page among the handwriting added pages by others.

Furthermore, when it is determined that the marks of the characterized pages are displayed to be superimposed based on the number of pages included in the file and distribution of the characterized pages, above the marks of the characterized pages are replaced with one specific mark, which displays at least one page position of the characterized pages determined to be displayed to be superimposed. Accordingly, it is possible to reduce the marks displayed to be superimposed on the scroll bar while allowing the user to understand a page position of the candidate of the desired page to display by the specific mark. Therefore, it is possible to more exactly search for the desired page.

Furthermore, the specific mark is extended in the second direction by being touched. Accordingly, by a touch input in a direction of extending the specific mark, it is possible to more easily and exactly display a plurality of characterized pages whose page positions are displayed by the specific mark. Therefore, it is possible to more easily search for and display a desired page to display.

Furthermore, the scroll bar is displayed outside the area in which the display unit displays the region of the file. Accordingly, it is possible to easily search for and display the desired page to display while fully ensuring a display area of the page.

Furthermore, the region of the file displayed by the display unit is a portion of one page. Accordingly, it is possible to change a place to be displayed on the screen in one page by moving the touch position close to or away from the scroll bar. Accordingly, it is possible to search for and display the desired page to display in a more flexible and detailed manner.

Second Embodiment

An electronic display terminal, a non-transitory computer readable storage medium stored with the program for the electronic display terminal, and a display method according to a second embodiment of the invention will be described.

A difference between the embodiment and the above-mentioned first embodiment is that the specific pen marks and the other pen marks are not displayed in the scroll bar in the embodiment. With regard to the other points, since the embodiment is the same as the first embodiment, a duplicated description will be omitted or simplified.

Figure 16:
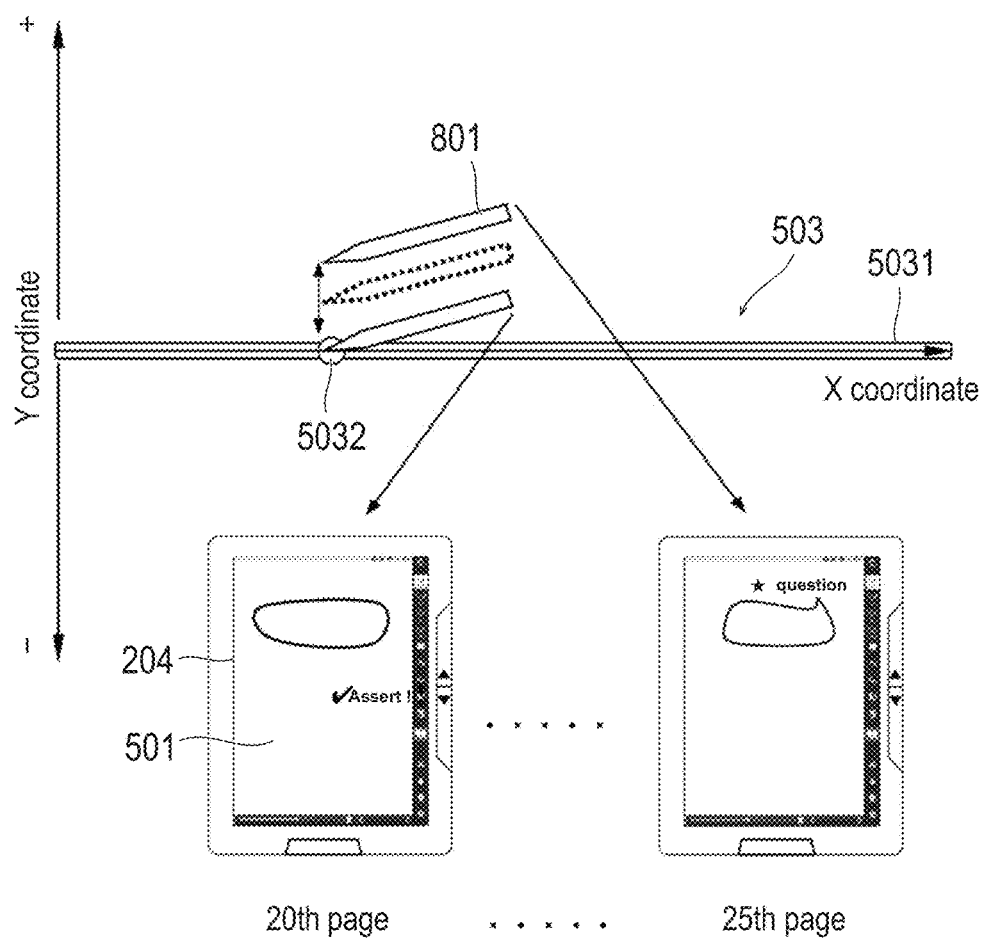
FIG. 16 is an explanatory diagram which illustrates how a page displayed in the page display region is switched according to the change of a position to be touched in a direction away from or towards the scroll bar in the electronic paper terminal according to a second embodiment of the invention.

FIG. 16 is an explanatory diagram which illustrates how a page displayed in the page display region is switched according to the change of a position to be touched in a direction away from or towards the scroll bar.

As shown in FIG. 16, coordinates for detecting a position which is touched by the touch pen 801 as coordinates are provided at the periphery of the bar 5031 of the scroll bar 503. The coordinates can be set by an X axis provided in the longitudinal direction (first direction) of the bar 5031 and a Y axis provided in a perpendicular direction (second direction) to the longitudinal direction of the bar 5031. The Y axis is provided in a different direction from the X axis, and may be provided, for example, in a direction of forming an angle of 45 degrees with respect to the X axis.

The X axis is set to be superimposed on the bar 5031, and an X coordinate is set to a portion superimposed on the bar 5031 of the scroll bar 503. Accordingly, a page displayed in the page display region 501 is switched by a touch input on the X axis. However, when the number of pages of a file is increased, an interval between X coordinates each corresponding to a page position of pages whose page numbers are adjacent to each other becomes narrow, so that it is difficult to switch a page displayed in the page display region 501 on a page by page basis by the touch input on the X axis.

In the embodiment, the X coordinate is set to be superimposed on the bar 5031 in the longitudinal direction of the bar 5031 of the scroll bar 503, and the Y coordinate is set in a perpendicular direction to the longitudinal direction of the bar 5031. Then, a page displayed in the page display region 501 is switched based on the X coordinate at a position which is touched, and moreover a page displayed in the page display region 501 is switched based on the Y coordinate at a touch input position. At this time, an amount of change in the Y coordinate of the touch input position which is necessary for switching the page to a page of a neighboring page number is set to be larger than the amount of change in the X coordinate. Accordingly, even when it is difficult to switch the page displayed in the page display region 501 on a page by page basis by a touch input on the X axis, it is possible to easily switch the page displayed in the page display region 501 on a page by page basis by moving the touch input position in a Y axis direction.

The knob 5302 of the scroll bar 503 is moved to a position on the bar 5031 which indicates a page position of the page displayed in the page display region 501 after the switching by a touch input.

The user performs the touch input on the X axis by regarding the length of the bar 5031 of the scroll bar 503 as a clue, and a page of a page number approximately close to the page number of the desired page to display is displayed in the display region 501. And then, the page displayed in the page display region 501 is switched on a page by page basis in a direction of increasing a page number by sliding the touch pen 801 in a plus direction of the Y axis to change the Y coordinate of the touch input position. Accordingly, it is possible to exactly display the desired page to display. The page displayed in the page display region 501 may be switched on a page by page basis in a direction of decreasing a page number by sliding the touch pen 801 in a minus direction of the Y axis to change the Y coordinate of the touch input position. Accordingly, it is possible to exactly display the desired page to display.

Additionally, the user can perform the touch input on a position away from the scroll bar 503 by regarding the length of the bar 5031 of the scroll bar 503 and a position of the knob 5302 which indicates a page position of a page currently displayed in the display region 501 as a clue. Accordingly, it is possible to more exactly display a desired page to display in the page display region 501 than when performing the touch input on the bar 5031 of the scroll bar 503.

In FIG. 16, since the knob 5032 of the scroll bar 503 is positioned at a position indicating a page position of a $20^{th}$ page, the $20^{th}$ page is displayed in the page display region 501 of the display unit 204. When moving a position touched by the touch pen 801 in the plus direction of the Y axis which is a direction away from the scroll bar 503 from this state, for example, it is possible to easily switch a page on a page by page basis from the $20^{th}$ page to the $25^{th}$ page to display a page in the page display region 501.

Figure 17:
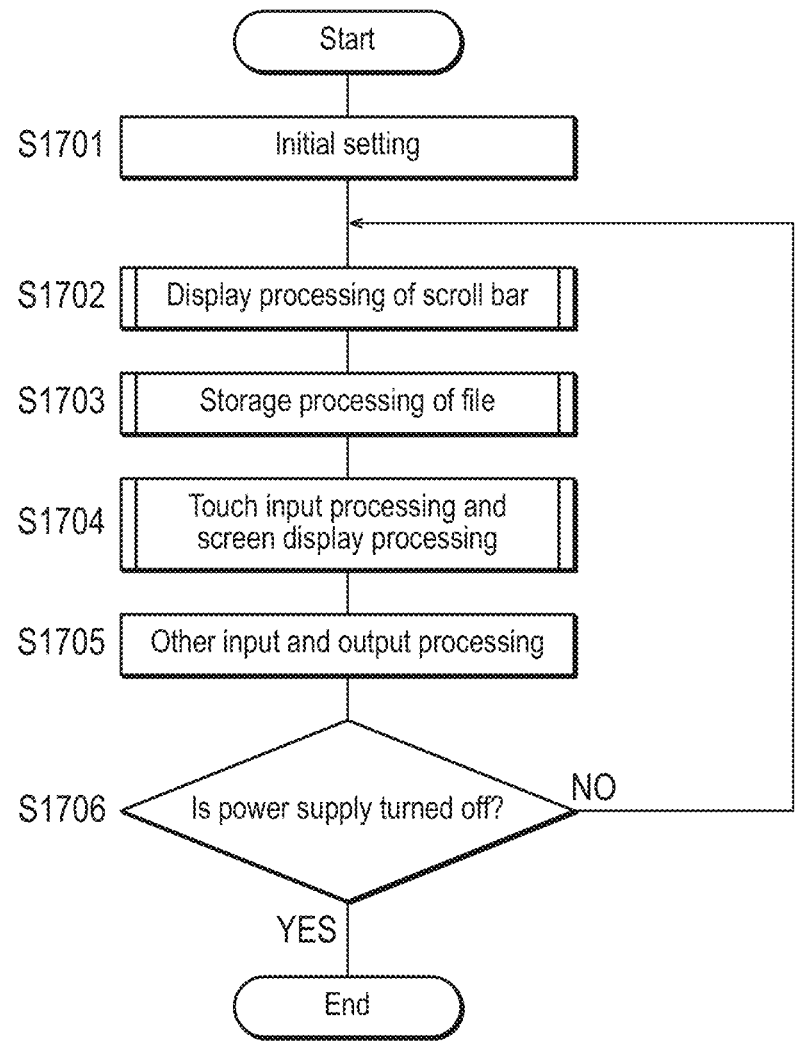
FIG. 17 is a flowchart of each operation of the electronic paper terminal according to the second embodiment of the invention.

FIG. 17 is a flowchart of each operation of the electronic paper terminal according to the embodiment.

The system unit 201 performs an initial setting when the power supply is turned on (S1701).

Figure 18:
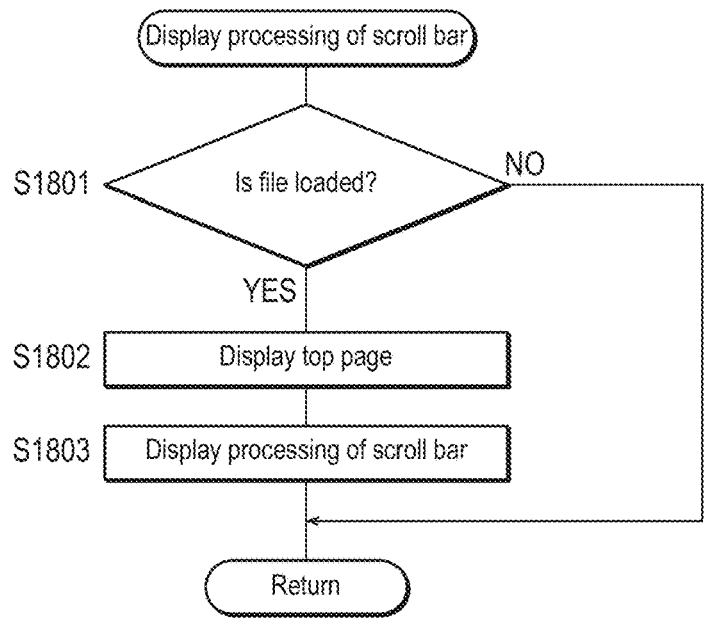
FIG. 18 is a subroutine flowchart of step S1702 in the flowchart of FIG. 17.

The system control unit 201 performs display processing of the scroll bar 503 (S1702). FIG. 18 is a subroutine flowchart of step S1702.

The system control unit 201 determines whether there is a loading of a new file based on an instruction of a user (S1801). The system control unit 201 ends the subroutine flowchart when it is determined that there is no load of a new file (NO in S1801).

When the system control unit 201 determines that there is a loading of a new file (YES in S1801), the system control unit 201 displays a top page (first page) of the loaded file to the page display region 501 of the display unit 204.

The system control unit 201 performs display processing of the scroll bar 503 to display the scroll bar 503 on the touch panel (S1803). At this time, at the periphery of the bar 5031 of the scroll bar 503, coordinates for detecting a touch input position as coordinates by the touch pen 801 are provided.

Figure 19:
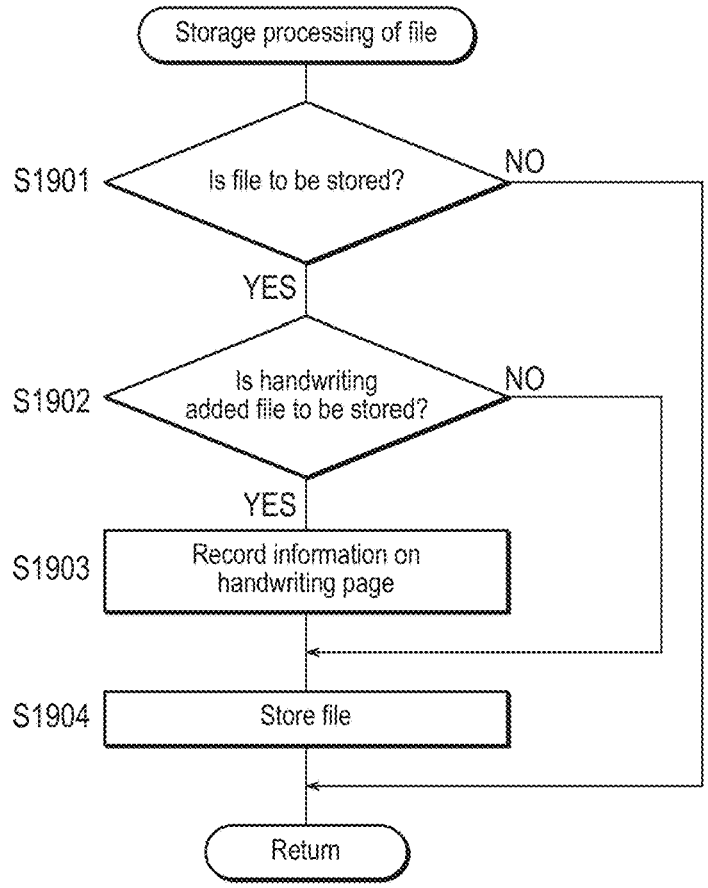
FIG. 19 is a subroutine flowchart of step S1703 in the flowchart of FIG. 17.

Returning to FIG. 17, the system control unit 201 performs storage processing of a file (S1703). FIG. 19 is a subroutine flowchart of step S1703.

The system control unit 201 determines whether or not to store a file based on an instruction by the user (S1901). The system control unit 201 ends the subroutine flowchart when it is determined not to store a file (NO in S1901).

When it is determined to store a file (YES in S1901), the system control unit 201 determines whether or not to store the handwriting added file by the user (S1902). The system control unit 201 proceeds to step S1904 and stores the file when it is determined not to store the handwriting added file (NO in S1902).

When it is determined to store the handwriting added file (YES in S1902), the system control unit 201 adds the information of a handwriting page to a file as layer data.

When the information of the handwriting is added to the file, the system control unit 201 stores both the information of the handwriting page and the file (S1904).

Figure 20:
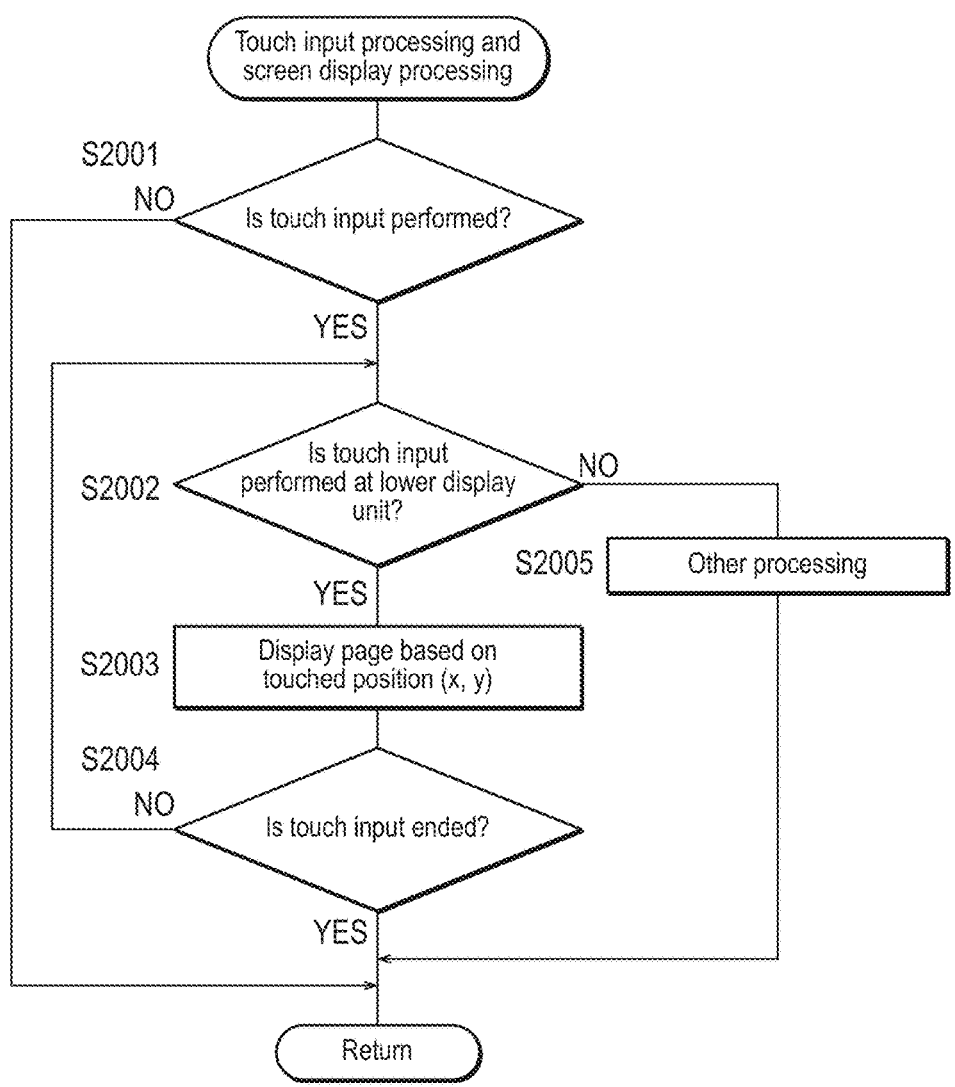
FIG. 20 is a subroutine flowchart of step S1704 in the flowchart of FIG. 17.

Returning to FIG. 17, the system control unit 201 performs touch input processing and screen display processing (S1704). FIG. 20 is a subroutine flowchart of step S1704.

The operation unit 205 determines whether or not a touch input is performed by the user (S2001). The operation unit 205 ends the subroutine flowchart when it is determined that a touch input is not performed (NO in S2001).

When it is determined that a touch input is performed (YES in S2001), the operation unit 205 determines whether the touch input is performed at the lower display unit 504 of the display unit 204, where coordinates for detecting a touch input position outside the area of the page display region 501, in which a page is displayed, is provided as coordinates (S2002). The operation unit 205 performs other processing (S2005) when determining the touch input is not performed at the lower display unit 504 (NO in S2002). Other processing is, for example, processing of inputting handwriting to a page.

When it is determined that the touch input is performed at the lower display unit 504 (YES in S2002), the operation unit 205, based on coordinates (X, Y) that is touched, displays a page at a page position corresponding to the coordinates in the page display region 501.

Steps S2002 to S2004 are repeated until the touch input is ended (S2004). That is, for example, the touch input is not ended while the user causes the touch pen 801 to slide as being touched at the lower display unit 504. Accordingly, in such a case, based on coordinates of a position sequentially touched by sliding of the touch pen 801, a page assigned to the coordinates is sequentially displayed on the page display region 501.

Returning to FIG. 17, the system control unit 201 performs the other input and output processing (S1705). For example, the other input and output processing is transmission of a handwriting added file to the PC 10.

The system control unit 201 repeatedly performs steps S1702 to S1706 until the power supply is turned off by a user (S1706).

As mentioned above, an electronic display terminal, a non-transitory computer readable storage medium stored with the program for the electronic display terminal, and a display method according to a second embodiment of the invention are described. However, the embodiment exhibits the following effects.

In the electronic display terminal including the scroll bar, the region of the document is switched, which is displayed based on a position element of the first direction that is the longitudinal direction of the bar of the scroll bar, and a position element of the second direction that is different from the first direction at a position on a screen that is touched by the user. Additionally, the page position of a page which includes the region displayed after the region is switched is displayed as a relative position of the indicator on the bar with respect to the length of the bar. Accordingly, it is possible to more exactly display the region of the desired document based on the touch input in a position away from the bar even when pages which candidates of the desired page are concentrated and the position of the page to display cannot be exactly touched on the bar of the scroll bar. Therefore, even if the number of pages of the document increases and candidates of the desired page to display are sequential so that candidates of a desired page to display is concentrated, it is possible to easily search for and display the desired page to display while ensuring the display region of the document.

The electronic display terminal, the non-transitory computer readable storage medium stored with the program for the electronic display terminal, and the display method according to the invention are not limited to the above-mentioned embodiment.

For example, in the above-mentioned embodiment, the handwriting added page is described as the characterized page. However the characterized page may be, for example, a page to which a bookmark which is generally added as a mark of page is added.

Additionally, display processing of the scroll bar and characterization of a page in the above-mentioned embodiment are not limited to the time when loading a new file, but may be sequentially updated when new handwriting processing is added by the user.

Additionally, in the above-mentioned embodiment, with respect to the pen mark which shows a page position of a single handwriting added page other than the specific pen mark, it is described that the entire page is displayed in the page display region by the touch input on the pen mark. However, a display scope (a region of a file) in, for example, a height direction in one page may be changed based on the touch input position on the pen mark.

Additionally, in the above-mentioned embodiment, the scroll bar is disposed at the lower portion of a page display region of the display unit. However the invention is not limited to the lower portion of the page display region as long as the scroll bar is disposed at the periphery of the page display region.

Additionally, in the above-mentioned embodiment, each operation of the electronic paper terminal is described to be performed based on a program, but some or all of the operations performed by the program may be replaced with hardware and performed.

What is claimed is:

1. An electronic display terminal comprising:
a display to display a region of a file on a screen, the file including a plurality of pages;
a scroll bar comprising a bar displayed on said screen, and an indicator displayed on said bar, said indicator indicating a page position of a page including said region displayed on said screen by a relative position with respect to the length of said bar; and
a mark display to display a plurality of single-page marks along the scroll bar, each of said single-page marks indicating a page position of one of a plurality of characterized pages included among said plurality of pages of said file,
wherein, when said mark display determines that some of said single-page marks of said characterized pages are to be superimposed on top of each other, the mark display displays a specific mark along the scroll bar, based on the number of pages included in said file and distribution of said characterized pages corresponding to a group of adjacent pages, said specific mark representative of the plurality of characterized pages among said plurality of pages of said file, and
wherein said specific mark is distinguishable from ones of the single-page marks that are not superimposed on top of each other,
wherein said scroll bar switches said region displayed by said display in response to a change in a first coordinate of a point touched by a user within said bar, the change in the first coordinate is in a first direction that is a longitudinal direction of said bar, and when said region is switched in response to the change in the first coordinate, said scroll bar moves said indicator to a position on said bar, said position indicating a page position of a page including said region displayed by said display, and
wherein said scroll bar switches said region displayed by said display in response to a change in a second coordinate of a point touched by the user within said specific mark displayed in the scroll bar, the change in the second coordinate is in a second direction along a line that is different from and not parallel to that of the first direction, and the characterized pages are displayed by the display as a result of said region being switched in response to the change in the second coordinate of the point touched by the user within said specific mark.

2. The electronic display terminal as claimed in claim 1, wherein each of said characterized pages is a handwriting added page.

3. The electronic display terminal as claimed in claim 1, wherein said specific mark displayed by said mark display is extended in said second direction by a touch input performed on said specific mark.

4. The electronic display terminal as claimed in claim 1, wherein said scroll bar is displayed outside an area in which said display displays said region of said file.

5. The electronic display terminal as claimed in claim 1, wherein said region of said file is at least one of one entire page and a portion of one page.

6. The electronic display terminal as claimed in claim 1, wherein an amount of said change in the second coordinate required for switching said region displayed by said display unit is greater than an amount of said change in the first coordinate required for switching said region displayed by said display unit.

7. A non-transitory computer readable storage medium stored with a program, said program causing an electronic display terminal to execute a process comprising:
displaying a region of a file on a screen, the file including a plurality of pages;
displaying a scroll bar comprising a bar displayed on said screen, and an indicator displayed on said bar, said indicator indicating a page position of a page including said region displayed on said screen by a relative position with respect to the length of said bar;
switching said region displayed on said screen in response to a change in a first coordinate of a point touched by a user within said bar, the change in the first coordinate is in a first direction that is a longitudinal direction of said bar, and when said region is switched in response to the change in the first coordinate, said scroll bar moves said indicator to a position on said bar, said position indicating a page position of a page including said region displayed by said display unit;

displaying a plurality of single-page marks along the scroll bar, each of said single-page marks indicating a page position of one of said plurality of characterized pages included among said plurality of pages of said file;

responsive to a determination that some of said single-page marks of said characterized pages are to be superimposed on top of each other, displaying a specific mark along the scroll bar, based on the number of pages included in said file and distribution of said characterized pages corresponding to the group of adjacent pages, said specific mark representative of the plurality of characterized pages among said plurality of pages of said file;

wherein said specific mark is distinguishable from ones of the single-page marks that are not superimposed on top of each other; and switching said region displayed on said screen to scroll through a group of adjacent pages in response to a change in a second coordinate of a point touched by the user within said specific mark displayed in the scroll bar, the change in the second coordinate is in a second direction along a line that is different from and not parallel to that of the first direction, and the characterized pages are displayed by the display unit as a result of said region being switched in response to the change in the second coordinate of the point touched by the user within said specific mark.

8. The non-transitory computer readable storage medium as claimed in claim 7,
wherein each of said characterized pages is a handwriting added page.

9. The non-transitory computer readable storage medium as claimed in claim 7,
wherein said displaying of said specific mark comprises extending said specific mark in said second direction by a touch input performed on said specific mark.

10. The non-transitory computer readable storage medium as claimed in claim 7,
wherein, during said displaying of said scroll bar, said scroll bar is displayed outside an area in which said region of said file is displayed.

11. The non-transitory computer readable storage medium as claimed in claim 7,
wherein said region of said file is at least one of one entire page and a portion of one page.

12. The non-transitory computer readable storage medium as claimed in claim 7, wherein an amount of said change in the second coordinate required for switching said region displayed by said display unit is greater than an amount of said change in the first coordinate required for switching said region displayed by said display unit.

13. A display method comprising;
displaying a region of a file on a screen, the file including a plurality of pages;
displaying a scroll bar comprising a bar displayed on said screen, and an indicator displayed on said bar, said indicator indicating a page position of a page including said region displayed on said screen by a relative position with respect to the length of said bar;
switching said region displayed on said screen in response to a change in a first coordinate of a point touched by a user within said bar, the change in the first coordinate is in a first direction that is a longitudinal direction of said bar, and when said region is switched in response to the change in the first coordinate, said scroll bar moves said indicator to a position on said bar, said position indicating a page position of a page including said region displayed by said display unit;

displaying a plurality of single-page marks along the scroll bar, each of said single-page marks indicating a page position of one of said plurality of characterized pages included among said plurality of pages of said file;

responsive to a determination that some of said single-page marks of said characterized pages are to be superimposed on top of each other, displaying a specific mark along the scroll bar, based on the number of pages included in said file and distribution of said characterized pages corresponding to the group of adjacent pages, said specific mark representative of the plurality of characterized pages among said plurality of pages of said file;

wherein said specific mark is distinguishable from ones of the single-page marks that are not superimposed on top of each other; and switching said region displayed on said screen to scroll through a group of adjacent pages in response to a change in a second coordinate of a point touched by the user within said specific mark displayed in the scroll bar, the change in the second coordinate is in a second direction along a line that is different from and not parallel to that of the first direction, and the characterized pages are displayed by the display unit as a result of said region being switched in response to the change in the second coordinate of the point touched by the user within said specific mark.

14. The display method as claimed in claim 13,
wherein each of said characterized pages is a handwriting added page.

15. The display method as claimed in claim 13,
wherein said displaying of said specific mark comprises extending said specific mark-in said second direction by a touch input performed on said specific mark.

16. The display method as claimed in claim 13,
wherein, during said displaying of said scroll bar, said scroll bar is displayed outside an area in which said region of said file is displayed.

17. The display method as claimed in claim 13,
wherein said region of said file is at least one of one entire page and a portion of one page.

18. The display method as claimed in claim 13, wherein an amount of said change in the second coordinate required for switching said region displayed by said display unit is greater than an amount of said change in the first coordinate required for switching said region displayed by said display unit.

* * * * *